(12) United States Patent
Lemonik et al.

(10) Patent No.: US 8,484,561 B1
(45) Date of Patent: Jul. 9, 2013

(54) SYSTEM AND METHOD FOR UPDATING AN OBJECT INSTANCE BASED ON INSTRUCTIONS RECEIVED FROM MULTIPLE DEVICES

(75) Inventors: Micah Lemonik, Great Neck, NY (US); John Day-Richter, Denver, CO (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/282,636

(22) Filed: Oct. 27, 2011

Related U.S. Application Data

(63) Continuation of application No. 13/224,479, filed on Sep. 2, 2011.

(51) Int. Cl.
  *G06F 17/00* (2006.01)
(52) U.S. Cl.
  USPC ........................................................ 715/255
(58) Field of Classification Search
  USPC ........................................................ 715/255
  See application file for complete search history.

(56) References Cited

U.S. PATENT DOCUMENTS

| | | | |
|---|---|---|---|
| 5,528,743 A | 6/1996 | Tou et al. | |
| 5,930,813 A | 7/1999 | Padgett et al. | |
| 6,006,239 A * | 12/1999 | Bhansali et al. ................. | 1/1 |
| 6,169,999 B1 | 1/2001 | Kanno | |
| 6,377,354 B1 | 4/2002 | Nguyen et al. | |
| 6,512,531 B1 | 1/2003 | Gartland | |
| 6,879,997 B1 | 4/2005 | Ketola et al. | |
| 6,972,748 B1 | 12/2005 | Lang | |
| 7,009,626 B2 | 3/2006 | Anwar | |
| 7,624,145 B2 | 11/2009 | Junuzovic et al. | |
| 7,712,016 B2 | 5/2010 | Jones et al. | |
| 7,792,788 B2 | 9/2010 | Melmon et al. | |
| 7,953,696 B2 | 5/2011 | Davis et al. | |
| 7,958,448 B2 | 6/2011 | Fattic, II et al. | |
| 8,044,961 B2 | 10/2011 | Opstad et al. | |
| 8,065,604 B2 | 11/2011 | Blankinship | |
| 2003/0115268 A1* | 6/2003 | Esposito ........................ | 709/205 |
| 2003/0179230 A1 | 9/2003 | Seidman | |
| 2004/0015781 A1 | 1/2004 | Brown et al. | |
| 2005/0234943 A1 | 10/2005 | Clarke | |
| 2007/0094601 A1 | 4/2007 | Greenberg et al. | |
| 2007/0233811 A1 | 10/2007 | Rochelle et al. | |
| 2007/0239695 A1 | 10/2007 | Chakra et al. | |
| 2009/0192845 A1 | 7/2009 | Gudipaty et al. | |
| 2010/0153948 A1 | 6/2010 | Schreiber et al. | |
| 2010/0241749 A1* | 9/2010 | Rasmussen et al. ............ | 709/226 |
| 2011/0178981 A1 | 7/2011 | Bowen et al. | |
| 2012/0072819 A1 | 3/2012 | Lindner | |

OTHER PUBLICATIONS

"Conflict Management for Real-Time Collaborative Editing in Mobile Replicated Architectures," Sandy Citro, 2007, Australian Computer Society, Inc., Thirteenth Austrailian Computer Science Conference (ACSC2007), pp. 115-124.*

(Continued)

*Primary Examiner* — Doug Hutton, Jr.
*Assistant Examiner* — Andrew McIntosh
(74) *Attorney, Agent, or Firm* — Wolff & Samson, PC

(57) ABSTRACT

A first instruction specifying a first change to an object instance associated with a document is received from a first device, and a second instruction specifying a second change to the object instance is received from a second device. A transformed operation is determined based on the first change and the second change, and the object instance is updated based on the transformed operation. For example, a visual representation of the object instance may be updated based on the transformed operation.

19 Claims, 25 Drawing Sheets

OTHER PUBLICATIONS

Chengzheng Sun, Operational Transformation in Real-Time Group Editors: Issues, Algorithms, and Achievements, ACM CCSCW, Seattle WA, 1998, pp. 59-68 attached.*

Unpublished U.S. Appl. No. 13/006,259, filed Jan. 13, 2011.
Unpublished U.S. Appl. No. 13/224,479, filed Sep. 2, 2011.
Unpublished U.S. Appl. No. 13/224,530, filed Sep. 2, 2011.
Unpublished U.S. Appl. No. 13/224,573, filed Sep. 2, 2011.
Unpublished U.S. Appl. No. 13/224,663, filed Sep. 2, 2011.
Unpublished U.S. Appl. No. 13/224,769, filed Sep. 2, 2011.
Unpublished U.S. Appl. No. 13/224,860, filed Sep. 2, 2011.
Unpublished U.S. Appl. No. 13/297,762, filed Nov. 16, 2011.
Unpublished U.S. Appl. No. 13/274,382, filed Oct. 17, 2011.
Unpublished U.S. Appl. No. 13/282,753, filed Oct. 27, 2011.
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/print/9108799/Online_office_apps_get_real_Google_Docs_vs_ThinkFree_vs._Zoho> (7 pp.).
Miller, Michael, "Googlepedia: The Ultimate Google Resource, Third edition," 2008, p. 276.
Olav Junker Kjaer, "Timing and Synchronization in JavaScript", Dev. Opera, Sections: "The Basics", "Event Queing", "Long Running Scripts" and "Advice on Timing", Feb. 27, 2007, downloaded from URL: htt//dev.opera.com/articles/view/timing-and-synchronization-in-javascript/, pp. 1-9.
PCT International Search Report corresponding to PCT Application No. PCT/US2011/001417 filed Aug. 11, 2011 (2 pages).
PCT Written Opinion of the International Searching Authority corresponding to PCT Application No. PCT/US2011/001417 filed Aug. 11, 2011 (7 pages).
Quinn, Laura S., "Comparing Online vs. Traditional Office Software, Will desktop or online office software fit your non-profit needs best?" May 21, 2010, courtesy of Idealware, TechSoup.org [online]. Retrieved from the Internet URL:http://www.techsoup.org/learningcenter/software/page11852.cfm (4 pp.).
Tyson, Herb, "Microsoft Word 2007 Bible," 2007, 112-115, 467, 523-525, 798.
Wikipedia, the free encyclopedia, "Model-View-Controller," last modified on Nov. 16, 2010 [online]. Retrieved from the Internet: URL:http://en.wikipedia.org/wiki/Model%E2%80%93view%E2%80%93controller (10 pp.).
Unpublished U.S. Appl. No. 13/166,844, filed Jun. 23, 2011.
Unpublished U.S. Appl. No. 13/493,798, filed Jun. 11, 2012.
Unpublished U.S. Appl. No. 13/493,672, filed Jun. 11, 2012.
Lemonik et al., System and Method for Using a Third-Party Add-On in a Collaborative Online Software Development Environment, unpublished U.S. Appl. No. 13/551,859, filed Jul. 18, 2012, pp. 1-103.
Lemonik et al., System and Method for Using a Third-System and Method for Using a Third-Party Add-On to Manipulate a Document in a Collaborative Online Software Development Environment, unpublished U.S. Appl. No. 13/551,772, filed Jul. 18, 2012, pp. 1-119.
Day-Richter et al., System and Method for Performing Data Management in a Collaborative Development Environment, unpublished U.S. Appl. No. 13/591,734, filed Aug. 22, 2012, pp. 1-101.
Day-Richter et al., System and Method for Managing Remote Procedure Calls Relating to a Third Party Software Application, unpublished U.S. Appl. No. 13/591,851, filed Aug. 22, 2012, pp. 1-98.
Googlepedia: The Ultimate Google Resource, Third Edition, 2008.
Conner, Zoho 4 Everyone, 2008.

* cited by examiner

428

| Date/Time of Activity (434) | User Name (436) | Activity Information (438) |
|---|---|---|
| MM/DD/YYYY 12:01:01 | User 1 | Activity 1 |
| MM/DD/YYYY 12:03:05 | User 2 | Activity 2 |

451 { (first data row)
452 { (second data row)

```
package info.nameofdatamodel.datamodel;

@Root MyDatamodel {
        Array<string> spacers;
        Array<style> styles;
        Cursor cursor;
        Map entities;
}
// Comments can be inserted here. The following is a union representing a cursor
Cursor {
        string entityID;
        integer cursorIndex;
        integer selectionEndIndex;
}
```

SYSTEM AND METHOD FOR UPDATING AN OBJECT INSTANCE BASED ON INSTRUCTIONS RECEIVED FROM MULTIPLE DEVICES

This application is a continuation of U.S. patent application Ser. No. 13/224,479, filed Sep. 2, 2011, which is incorporated herein by reference.

TECHNICAL FIELD

This specification relates generally to systems and methods for providing document processing services, and more particularly to systems and methods for providing collaborative online document processing services.

BACKGROUND

Existing online document processing services allow users to create and manipulate documents via the Internet, and store the documents at a remote location. Typically, a user accesses an online document processing service using a web browser operating on a computer or other device. By storing a document at the remote location, a user can access the document from any location, using a computer or other device that has access to the Internet. While existing online document processing services enable a single user to access and edit a document remotely, these services offer limited collaboration capabilities. Therefore, a need exists for an online document processing service that enables multiple users to access a document and collaboratively edit the document.

SUMMARY

In accordance with an embodiment, a first instruction specifying a first change to an object instance associated with a document is received from a first device, and a second instruction specifying a second change to the object instance is received from a second device. A transformed operation is determined based on the first change and the second change, and the object instance is updated based on the transformed operation. For example, a visual representation of the object instance may be updated based on the transformed operation.

In one embodiment, a request to apply the transformed operation to a first visual representation of the object instance is transmitted to the first device, and a request to apply the transformed operation to a second visual representation of the object instance is transmitted to the second device.

In another embodiment, a determination is made whether a first result of applying the first change and then the second change to the object instance, and a second result of applying the second change and then the first change to the object instance, are the same. If the first and second results are not the same, the transformed operation is determined.

In an embodiment, a first transformed operation and a second transformed operation are determined, wherein a first transformed result of applying the first transformed operation and then the second transformed operation to the object instance is the same as a second result of applying the second transformed operation and then the first transformed operation to the object instance.

In another embodiment, a redraw approach that effects the first and second transformed operations in a visual representation of the object instance using fewer redraws than a number of mutations associated with the first and second transformed operations is determined.

In an embodiment, a first user employing the first device and a second user employing the second device are allowed to access the object instance substantially simultaneously, and the second instruction is received from the second device prior to a transmission to the second device of a request to apply the first change to the second visual representation of the object instance.

In an embodiment, the object instance comprises a data type selected from a primitive, an ordered list, and a map. The object instance may be associated with a context type selected from a text document, a spreadsheet document, a drawing, a photograph, an image, a video, a music document, and a design document.

In another embodiment, the first and second instructions are stored and subsequently processed in accordance with a batch processing method.

In one embodiment, a request to apply the first transformed operation and the second transformed operation to a visual representation of the object instance may be transmitted to the first device.

In another embodiment, a first reverse operation corresponding to a reverse of the first transformed operation is generated and stored on a stack. When a selection of an undo option is received from a user, the first reverse operation is retrieved from the stack, and applied to the object instance.

These and other advantages of the present disclosure will be apparent to those of ordinary skill in the art by reference to the following Detailed Description and the accompanying drawings.

DETAILED DESCRIPTION

Figure 1:
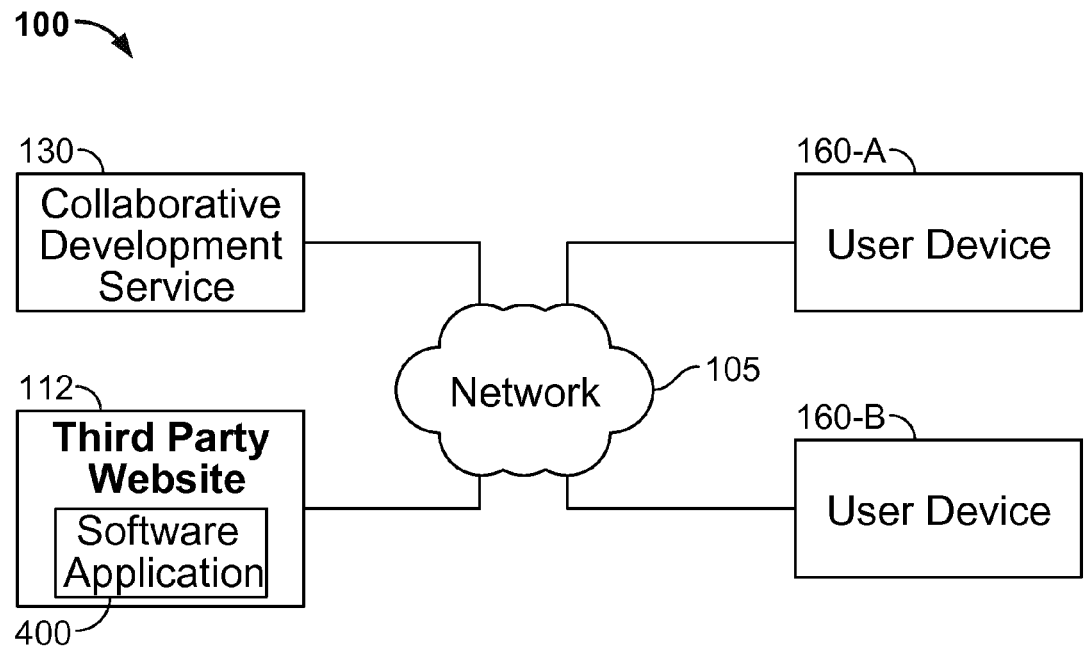
FIG. 1 shows a communication system that may be used to provide collaborative development services in accordance with an embodiment.

FIG. 1 shows a communication system 100 that may be used to provide collaborative development services in accordance with an embodiment. Communication system 100 includes a network 105, a collaborative development service 130, a third party website 112, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Collaborative development service 130 provides a platform and software development services to software developers, enabling developers to create, display, edit, and operate a variety of software applications, pertaining to a variety of different content types. For example, one or more developers may access collaborative development service 130 via network 105 and develop a software application that provides word processing services with respect to text documents. In other embodiments, collaborative development service 130 also enables developers to develop software applications that provide services relating to other content types, including, without limitation, spreadsheet applications, drawing tools, photo or image editing applications, video editing applications, design tools, software development tools, audio or music editing applications, games, etc. After a developer uses collaborative development service 130 to create a software application, the developer may maintain the software application at collaborative development service 130 or at third party website 112.

In the illustrative embodiment of FIG. 1, third party website 112 is a website associated with one or more software developers who are desirous of using collaborative development service 130 to create a software application. For example, third party website 112 may be a website associated with an entity that wishes to develop a word processing application, a music editing application, a spreadsheet application, or another type of software application, and that wishes to make the software application available to end users via the Internet.

Collaborative development service 130 also enables end users to access various software applications maintained by collaborative development service 130 or at third party websites, and provides a platform to use a respective software application to create and edit documents. End users may access a variety of applications and create documents relating to a variety of different content types, including, without limitation, text documents, spreadsheets, drawings, photographs, images, video files, music or audio files, designs, etc. As used herein, the term "document" may also include a shared user space, created and/or used by a software application, that receives and maintains inputs from multiple end users. For example, an online game application may use a shared user space in which user inputs are received, and in which all or a portion of game-related actions are performed. Similarly, an online calculator may create a temporary shared user space in which user inputs are received and results are presented.

The term "end user" and "user" are used herein interchangeably.

Collaborative development service 130 may be accessible via a World Wide Web page that may be viewed using a conventional Web browser, for example. A developer may be required to log into a respective account to access a software application or document. Similarly, an end user may be required to log into a respective account to access his or her documents. Collaborative development service 130 may grant to a developer or end user access rights with respect to a software application or document, such as viewing and/or editing rights.

User device 160 may be any device that enables a developer or user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
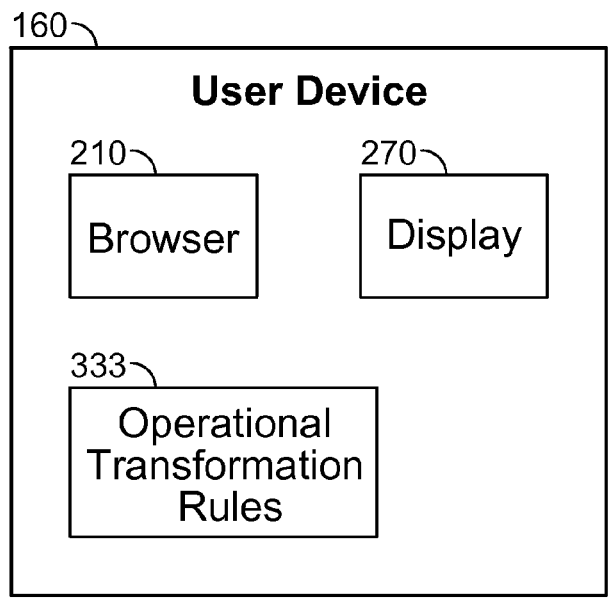
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays software applications, documents, images, Web pages, and other information. For example, all or a portion of a document that a user creates or edits may be displayed on display 270. A set of operational transformation rules 333 is stored in user device 160. Operational transformation rules 333 are discussed in more detail below.

Figure 3:
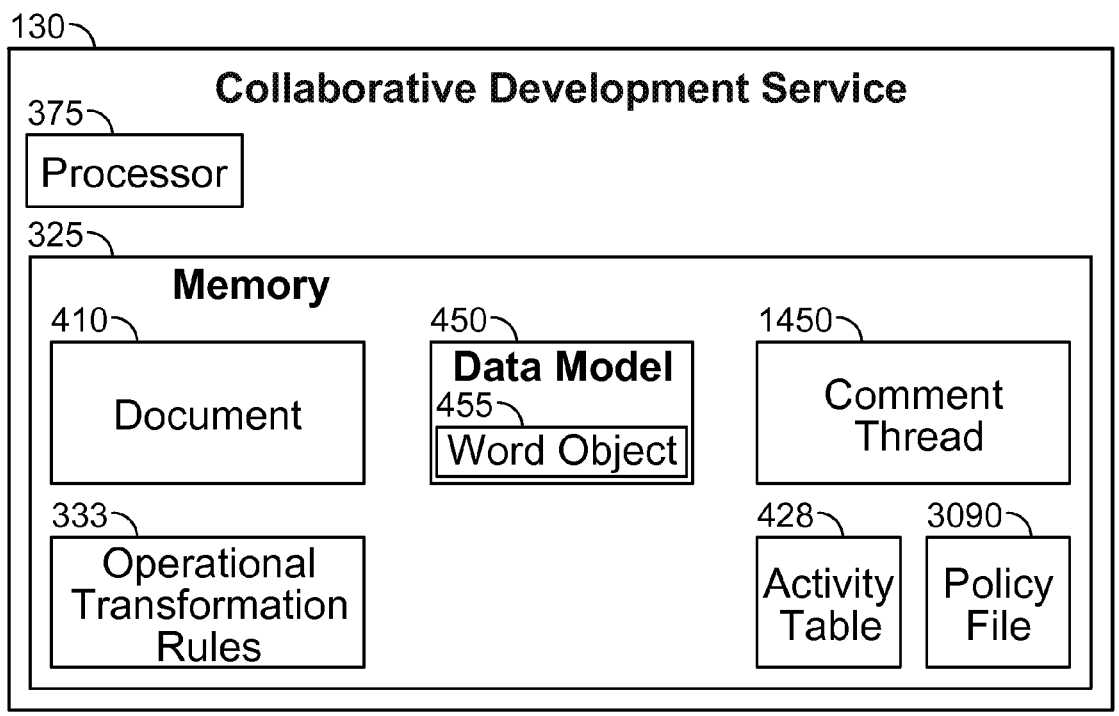
FIG. 3 shows functional components of a collaborative development service in accordance with an embodiment.

FIG. 3 shows functional components of collaborative development service 130 in accordance with an embodiment. Collaborative development service 130 includes a processor 375 and a memory 325. Collaborative development service 130 may include other components not shown in FIG. 3. Operational transformation rules 333 are also stored in memory 325 of collaborative development service 130 as well as in user device 160.

In accordance with the embodiment of FIG. 1, collaborative development service 130 provides an object-oriented software development architecture that allows developers to create software applications based on data models. In particular, collaborative development service 130 provides access to three basic data types for use in constructing a data model: ordered lists (arrays), maps, and primitives. Collaborative development service 130 supports several primitive types, including, without limitation, float, integer, Boolean, string, and date. A developer may generate an object using lists, maps, and primitives, and may further create a data model that includes one or more objects. The data models created in this manner may be used to create a software application relating to a variety of content types, including, without limitation, word processing applications, spreadsheet applications, drawing tools, photo or image editing applications, video editing applications, design tools, software development tools, audio or music editing applications, games, software applications having a shared user space, etc.

In accordance with an embodiment, a data model is a rooted tree, where nodes are either maps or ordered lists, and leaves are primitive values. Any node in the tree can be specified using an ordered list, referred to as a "target path," of key names and array indices. A software application developed using collaborative development service 130 has a single root data model object, referred to as the root map. All application-specific data is nested inside the root map.

In accordance with an embodiment, collaborative development service 130 supports two operations for the instantiation and deletion of non-primitive objects, two operations on array data, and one operation on map data. The supported operations, or mutations, are described below.

CreateObject(String id, String typeName): Creates an empty object of the given type with the given id. The typeName may be a user-defined type name or one of the built-in types like "Map" or "Array".

DeleteObject(String id): Deletes an object with the given id. All references to an object must be removed before an object can be deleted. Mutations that refer to a deleted object are transformed to nothing. If an object deletion is undone, the reverse mutation includes all mutations necessary to fully reconstruct the deleted object.

Update(TargetPath path, Object value|ObjectReference objectId): Replaces a key in a map or an index of an array with the given primitive value or object reference. If the value is null, the key is deleted entirely. Array indices are updated using the Update( ) mutation.

InsertBefore(TargetPath path, Object value|ObjectReference objectId): Inserts a primitive value or an object reference into an ordered list before a given index. All higher-indexed values in the list are shifted to the right.

Delete(TargetPath path): Deletes a value from an array. All higher-indexed values in the list are shifted to the left.

In accordance with an embodiment, a developer may begin building an application by writing a data model definition file. Collaborative development service 130 provides a compiler service that compiles the data model definition file to generate a collection of Javascript files that represent the user's data model. The developer may code against this API.

Accordingly, a developer employing user device 160 or other processing device may access collaborative development service 130 via network 105 and define one or more objects based on ordered lists, maps, and primitives. A developer may further construct a data model based on the objects built from the lists, maps, and primitives. For example, a data model may include a word object having an ordered list of alphanumeric characters defining a word, an image object having an ordered list of pixel values defining an image, a line graph object having an ordered list of values to be plotted, etc. A data model may include other types of objects built from the lists, maps, and primitives provided, such as a paragraph object, a spreadsheet column object, a line object, a rectangle object, etc.

A developer may then create a software application based on the data model. After a software application is created, the software application may be maintained at third party website 112, for example. A user of the software application may access the software application via collaborative development service 130 and create a document. The user may then create an instance of an object, or object instance, within the document by defining the characteristics of the object. For example, supposing that software application defines a word object that includes an ordered list of alphanumeric characters, a user may create a document and generate an instance of the word object by typing a word, thereby specifying the alphanumeric characters within the list. The user may also specify other characteristics of the word object instance such as the font, size, etc.

Suppose, for example, that a developer associated with third party website 112 accesses collaborative development service 130 and creates a data model that includes a word object. The data model (including the word object) is stored in memory 325 as data model 450 and word object 455, as shown in FIG. 3. The developer then develops a software application based on the data model, and maintains the software application (indicated in FIG. 1 as software application 400) at third party website 112. In the illustrative embodiment, software application 400 is created for use in relation to a word processing application, and enables users to create and edit text documents. Software application 400 may include other word processing functions. For example, software application 400 may enable a user to create a paragraph (an instance of a paragraph object), a footnote (an instance of a footnote object), etc.

In accordance with an embodiment, after software application 400 is placed at third party website 112, a user may access software application 400 via collaborative development platform 130 and use software application 400 to create and/or edit a document. Suppose, for example, that a user accesses his or her account at collaborative development service 130 and accesses software application 400, by clicking on a link on a web page, or by selecting an option from a menu, for example. Suppose further that the user employs software application 400 to create a text document. In the illustrative embodiment of FIG. 3, the user's document is stored in memory 325 as document 410.

Suppose now that the user uses software application 400 to edit document 410. In particular, the user types text within document 410, including one or more words. When the user types a word, collaborative development service 130 generates an instance of word object 455 by defining an ordered list containing the alphanumeric characters specified by the user, and by specifying any other associated characteristics of the word. Supposing, for example, that the user types the alphanumeric characters "helloworld," collaborative development service 130 generates within document 410 a word object instance 424 which includes an ordered list 407 containing the alphanumeric characters "helloworld," as shown in FIG. 4B.

Figure 4A:
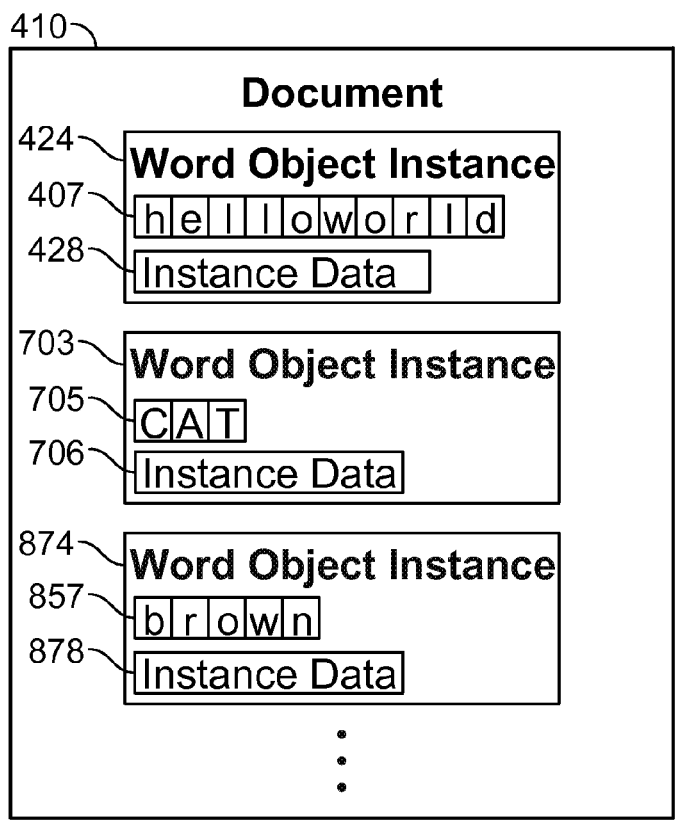
FIG. 4A shows a document in accordance with an embodiment.
Figures 4B, 5:
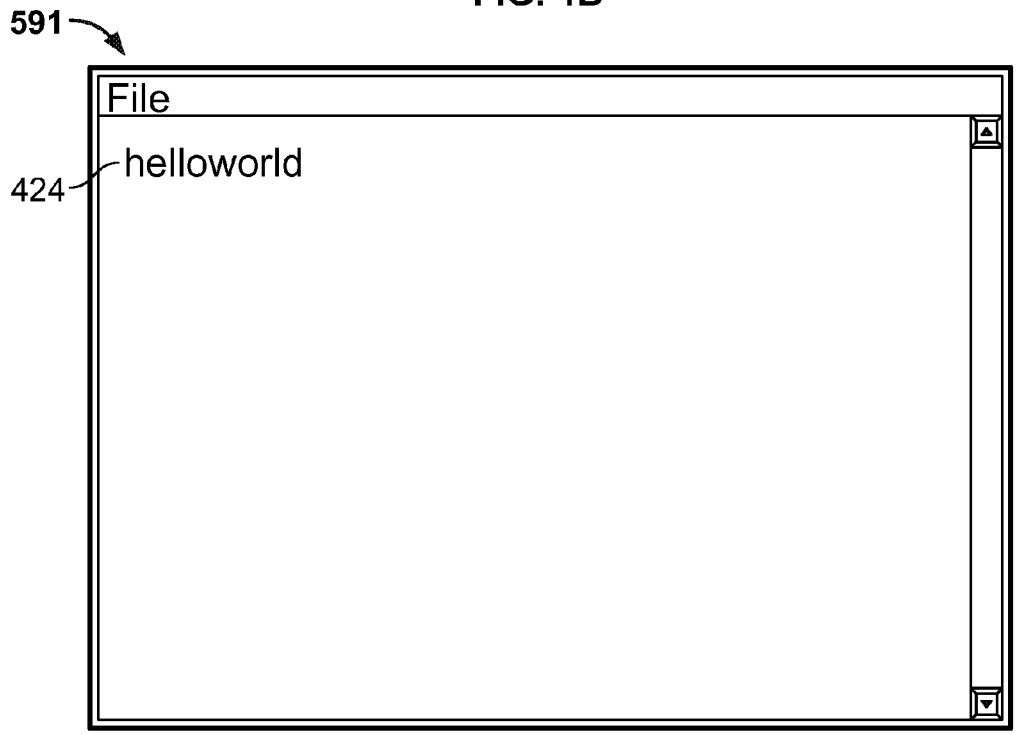
FIG. 4B shows an activity table in accordance with an embodiment.
FIG. 5 shows a word object instance displayed on a web page in accordance with an embodiment.

Referring to FIG. 4A, word object instance 424 also includes instance data 428 which includes various types of data related to word object instance 424. Instance data 428 includes text layout information specifying the layout of the text defined by ordered list 407, such as numbered spacers corresponding to the relative location of each of the characters in the text. Object instance 424 may include other types of information not shown in FIG. 4B.

In other embodiments, layout information relating to an object instance may be stored separately from the object instance itself. For example, such data may be stored in a database, table, or in another type of data structure.

A well-known technique used to display information on a user device includes transmitting data adapted to cause the user device to display all or a portion of the information on a Web page. For example, collaborative development service 130 may transmit to browser 210 (of user device 160) a request, in the form of HyperText Markup Language (HTML), adapted to cause browser 210 to display a representation of word object instance 424. In response, browser 210 displays a representation of object instance 424. FIG. 5 shows a web page 591 on which word object instance 424 is displayed as part of a text document, in accordance with an embodiment.

In an embodiment, an object instance may be updated based on one or more instructions received from users. For example, an instruction to add a letter to the end of word object instance 424 may be received from a user employing a user device 160. In response, collaborative development service 130 modifies word object instance 424, and then transmits a request to user device 160 to redraw word object instance 424 on display 270 to effect the change in the visual representation of the word object instance. In response to the request, user device 160 redraws word object instance 424 on display 270 to reflect the change.

In accordance with an embodiment, collaborative development service 130 maintains a record of all user activities and revisions related to a particular document in a user activity table, and enables users to view activity and/or revision history pertaining to the particular document. FIG. 4B shows an example of an activity table that may be associated with document 410 in accordance with an embodiment. Activity table 428 includes a column 434, which indicates a date and time of an activity perform by a user, such as accessing or leaving a document, or making a revision to the document. Activity table 428 includes a column 436 identifying the user who performed the activity. Column 438 describes the activity performed by the user, such as entering or leaving a document, or making a change to the document. For example, row 451 indicates that User 1 performed a first activity, Activity 1, at MM/DD/YYYY at 12:01:01. Row 452 contains data related to a second activity performed by User 2 at MM/DD/YYYY at 12:03:05. In this example, activity table 428 is stored in memory 325, as shown in FIG. 3.

In accordance with an embodiment, collaborative development service 130 utilizes fundamental edits to provide editing features. The fundamental edits correspond to the smallest changes that may be made to an object instance, and may be utilized in various combinations to provide all of the possible editing functions provided by collaborative development service 130. The fundamental edits may vary by content type. For example, fundamental edits for a word processing editor may include inserting a character, deleting a character, applying a style, inserting an entity (e.g., a numbered list), and updating an entity. Fundamental edits for a drawing tool may include moving an object one pixel in a given direction, deleting an object, etc.

As fundamental edits are applied to an object instance, activity table 428 is updated such that a revision history, including a running collection of applied changes, is maintained.

Combinations of two or more fundamental edits may be referred to as a command. As such, commands correspond to modifications that make use of two or more fundamental edits. For example, an "Insert Column in Table" command may utilize multiple "insert character" fundamental edits, and may also utilize multiple "apply style" fundamental edits to insert a column into a table within a document.

Redraw Optimization

When instructions requesting multiple fundamental edits with respect to a particular object instance are received from a user device 160, collaborative development service 130 applies each requested fundamental edit to the object instance in response to instructions. However, rather than sending to user device 160 a separate request to redraw the visual representation of the object instance after applying each fundamental edit to the object instance, collaborative development service 130 instead determines an efficient redraw approach that reduces the number of redraws required. For example, collaborative development service 130 may analyze the instance data associated with the object instance, including layout data, and/or revision history data within activity table 428 indicating multiple fundamental edits performed during execution of a command, and based on such information, merge several fundamental edits or otherwise reduce the number of redraws needed to render the changes as compared to the number of fundamental edits that have actually been applied to the object instance. A request is then transmitted to one or more user devices to redraw the object instance to effect the changes in the visual representation of the object instance.

In one example, following either a full or partial completion of an instruction pertaining to an instance of a text object (a word object, a paragraph object, etc), the instance data (including updated layout data) and the revision history data within activity table 428 may be analyzed to determine which alphanumeric characters, lines, or sections of the document have been affected. In a specific example, when a command includes a first fundamental edit that is applied to a particular alphanumeric character, and a second fundamental edit that supersedes the first fundamental edit (e.g., a letter "g" is typed, and then a letter "p" is typed in the same position), a redraw approach may be determined that eliminates the first fundamental edit. In another example, fundamental edits that affect adjacent alphanumeric characters may be merged.

A request is transmitted to one or more user devices 160 to redraw the visual representation of the updated object instance, thereby efficiently redrawing the object instance on user device 160 using a reduced number of redraws (e.g., by combining two or more of the redraws into a single redraw). In such a manner, the number of redraws that are used to redraw the visual representation of the object instance is less than the number of fundamental edits that were performed as part of the command. Examples of systems, methods and apparatus for determining a redraw approach using a reduced number of required redraws to render an updated object instance are described in U.S. patent application Ser. No. 13/006,259, entitled "Merging Electronic Document Redraws," filed Jan. 13, 2011, which is incorporated herein by reference.

In accordance with an embodiment, a plurality of instructions specifying respective changes to an object instance are received from a user device 160 and applied to the object instance. An efficient redraw approach reflecting the requested changes is then determined. An instruction to implement the redraw approach is then transmitted to the user device 160. The user device 160 redraws the object instance based on the instruction.

While the discussion herein uses examples relating to text documents and word object instances, the methods and systems described herein may be applicable to determine a redraw approach for object instances related to a variety of content types, including, without limitation, spreadsheets, drawings, photographs, images, videos, designs, music, software code, games, a software application having a suitable shared user space, etc.

For example, one approach to reducing the number of redraws applied to an object instance relates to adjacent character insertions in a collaborative typing context. For example, when a user who wishes to edit text document 410 requests a first character insertion, and then requests a second character insertion adjacent to the first (e.g., a first requested operation is to insert the characters "ab" at a given location, and a second requested operation is to insert characters "cd" adjacent to the inserted characters), a non-optimized redraw approach may include performing two separate redraws of the line—first to redraw the line with the characters "ab" inserted at the appropriate location, and then to redraw the line with the characters "cd" inserted at the appropriate location. However, in accordance with an embodiment, the insertions are merged such that the insertions are achieved by a single redraw of the text. A request to redraw the object instance in this manner is transmitted to user device 160, and a single redraw is performed.

Returning to the illustrative embodiment, suppose that a user employing a user device 160 accesses object instance 424 and begins to edit the object instance. For example, the user may generate instructions to edit the object by pressing a key on a keyboard, or by pushing a button on a computer mouse, etc. Instructions reflecting the user's changes are transmitted to collaborative development service 130 by user devices 160.

Figure 6:
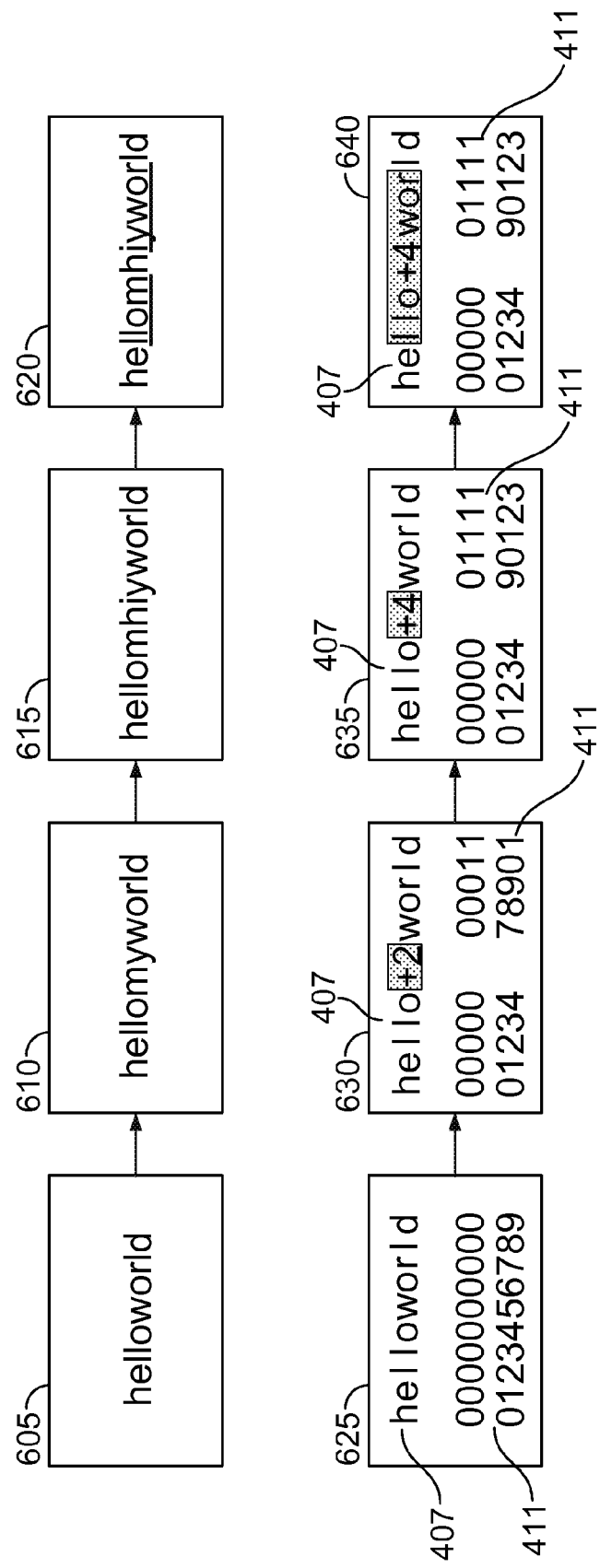
FIG. 6 illustrates several changes made to a word object instance in accordance with an embodiment.

FIG. 6 is an illustration of several changes made by the user to object instance 424 in accordance with an embodiment. The top row of boxes 605, 610, 615, and 620 indicate a series of edits to word object instance 424 desired by the user, which are specified by instructions received from the user. The bottom row of boxes 625, 630, 635, and 640 illustrate changes actually made to word object instance 424 by collaborative development service 130 in response to the user's instructions.

Box 605 shows word object instance 424 before an instruction is received. Box 625 shows list 407, and also shows text layout information 411, which includes a portion of instance data 428 that pertains to the layout of the text. Numbered spacer "00" corresponds to the first letter in list 407, "h", and numbered spacer "07" corresponds to the eighth letter in list 407, "r", etc.

A first instruction specifying a first desired change to the object instance is received from user device 160. Referring to box 610, the user inserts the characters "my" after the "hello" text and before the "world" text. User device 160 transmits a request to make the desired change. Referring to box 630, the insertion is represented in layout information 411 as the insertion of two additional spacers following the fifth spacer (numbered "04"), which corresponds to the last character in "hello," and renumbering the remaining spacers accordingly to accommodate the two inserted characters.

User activity table 428 (shown in FIG. 4B) is also updated to specifically identify the change, and the date and time the change was requested. Activity table 428 is further updated to identify the user of user device 160 as the source of the instruction.

In the illustrative embodiment, the user transmits an additional instruction to modify the text further by inserting the characters "hi" between the "m" and the "y" characters that were previously inserted, as shown in box 615. Referring to box 635, in layout information 411 the second insertion is merged with the first insertion rather than being handled separately. As such, in layout information 411 the change is represented as an insertion of four characters after the "hello" text and before the "world" text. The two insertions are represented as the insertion of four additional spacers following the fifth spacer (number "04"), and renumbering the remaining spacers accordingly.

An instruction is now received from the user to modify word object instance 424 by applying an "underline" style to the "llomhiywor" text, as shown in box 620. Referring to box 640, layout information 411 is modified to convey that the "underline" style should be applied to spacers numbered "02" through "11", and therefore, that the range of spacers numbered "02" through "11" should be updated.

Activity table 428 is updated to specifically identify these changes, and the date and time the change were requested. Activity table 428 is further updated to identify the user of user device 160 as the source of the instructions.

A redraw approach is now determined based on the changes made to object instance 424. In the illustrative embodiment, layout information 411 indicates that the range of spacers number "02" through "13" should be updated in a single operation to effect the changes made to object instance 424.

The optimized redraw approach is used to update the visual representation of the object instance is updated on user device 160. Collaborative development service 130 transmits a request to user device 160 to update the visual representation of object instance 424 by redrawing the range of spacers numbered "02" through "11" to effect the changes specified in the modified instance data 428. In the illustrative embodiment, the request directs user device 160 to complete the changes by performing a single redraw, instead of three redraws. In response, user device 160 performs a single redraw in accordance with the request to effect the specified changes.

Operational Transformations

In accordance with an embodiment, collaborative development service 130 may receive, substantially simultaneously, from a plurality of user devices, multiple instructions specifying respective changes to an object instance. In response, collaborative development service 130 uses operational transformation rules 333 to determine, for each respective user device, a transformed instruction, or set of transformed instructions, to cause the user device to display the changed object instance accurately and consistently, and transmits the transformed instruction(s) to the respective user device.

Referring again to FIG. 3, operational transformation rules 333 include rules governing the modification of an object instance, and the redrawing of the visual representations of the object instance on multiple user devices, when multiple changes are made to the object instance. In one embodiment, operational transformation rules 333 resolve conflicting changes specified in a plurality of instructions received from a plurality of user devices. When a plurality of instructions received from a plurality of user devices specify conflicting changes to a document that may create inconsistent visual representations of the document across the respective user devices, one or more operational transformations are applied to generate one or more transformed operations operable to reflect the specified changes in a consistent manner in the visual representations displayed on the respective devices. In particular, the rules apply a logic that contextualizes the changes specified by multiple instructions to determine a resolution that will result in a consistent visual representation of a document or object instance across multiple devices, without creating a collision (such as a temporal paradox or a race condition). In one embodiment, operational transformations are applied to instructions received from user devices in real-time or substantially in real-time, to enable the respective user devices to update the respective visual representations of the document in real-time or substantially in real-time.

Referring to FIG. 3, processor 375 examines instructions received from respective user devices 160 and selectively applies operational transformation rules 333 to determine transformed operations. In an embodiment, processor 375, in accordance with operational transformation rules 333, examines a first instruction P (received from a first device) specifying a first change to an object instance, and a second instruction Q (received from a second device) specifying a second change to the object instance, and determines a set of transformed operations (P',Q') in accordance with the following transformation rule:

$$T(P,Q) \rightarrow P', Q' \text{ such that } P*Q' == Q*P' \quad \text{(Rule 1)}$$

The application of Transformation Rule 1 is described in the illustrative embodiments discussed below.

Figure 7A:
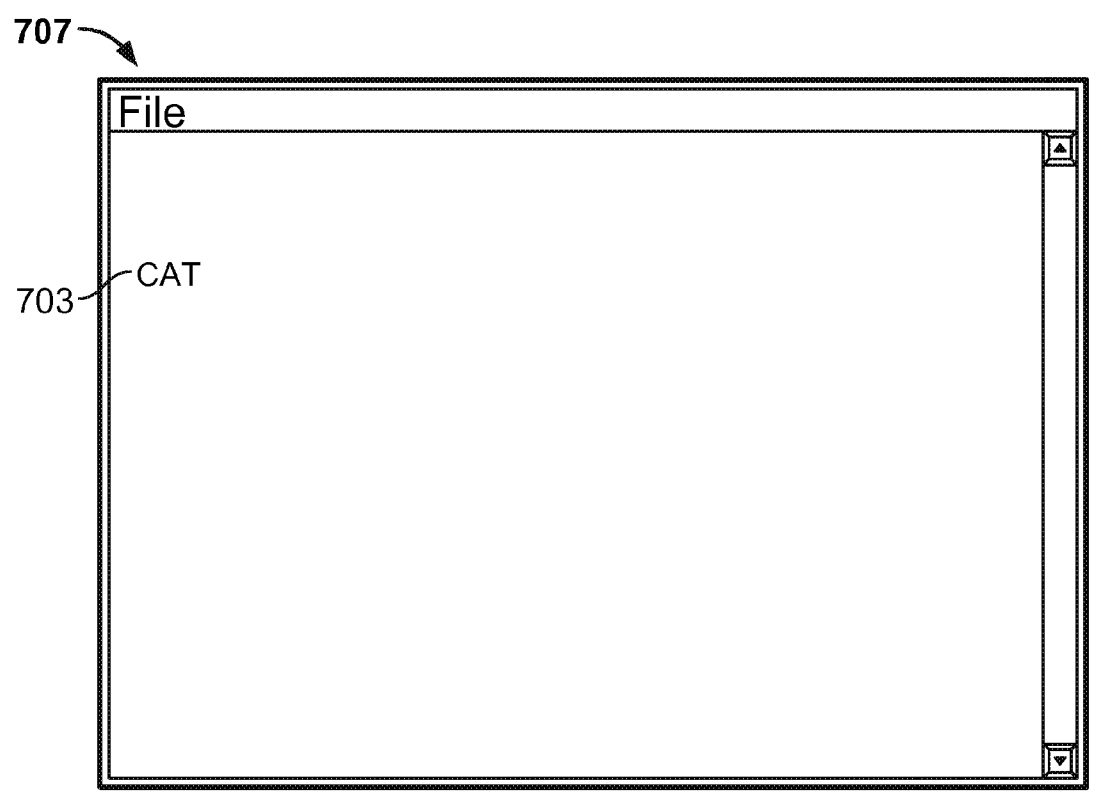
FIG. 7A shows a word object instance displayed on a web page in accordance with an embodiment.

Suppose, for purposes of illustration, that a first user employing user device 160-A, uses collaborative development service 130 to access software application 400, and accesses document 410. A second user employing user device 160-B, simultaneously accesses document 410 in the same manner. The first user types the word "CAT" within document 410. Referring to FIG. 4A, a word object instance 703 (including ordered list 705 and instance data 706) is created within document 410. Word object instance 703 is viewed by the first and second users via web pages displayed on user device 160-A and user device 160-B, such as web page 707 shown in FIG. 7A.

The first and second users now wish to collaboratively edit the word "CAT." Processor 375 receives from user device 160-A a first instruction, reflecting a change made by the first user, to replace the first character "C" of a word object instance "CAT" with the characters "CH." A second instruction, reflecting a change made by the second user, is received from user device 160-B to replace the third character of the word, "T", with the character "R." The second instruction is received by processor 375 before a request has been transmitted to the user device 160-B to update that device's visual representation of the word based on the first instruction.

Figure 7B:
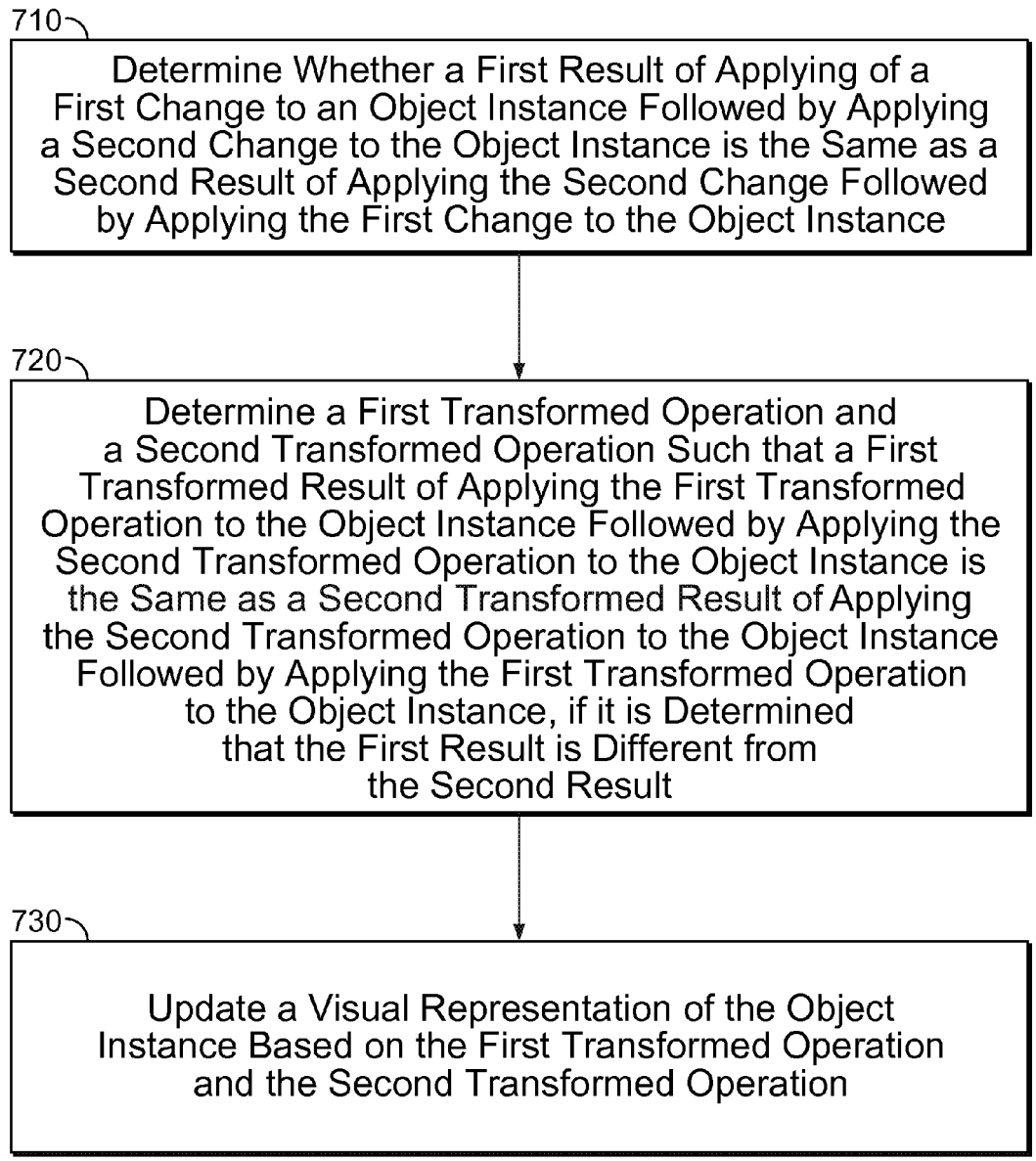
FIG. 7B is a flowchart of a method for providing collaborative development services in accordance with an embodiment.

FIG. 7B is a flowchart depicting a method of updating a visual representation of an object instance in accordance with an embodiment. At step 710, a determination is made as to whether a first result of applying of a first change to an object instance followed by applying a second change to the object instance is the same as a second result of applying the second change followed by applying the first change to the object instance. In the illustrative embodiment, processor 375 determines that application of the first change followed by application of the second change results in the character string "CHRT", while application of the second change followed by application of the first change results in the character string "CHAR," and that these two results are different. Therefore, requesting that the user devices to apply the first change and the second change may result in inconsistent visual representations on the users' devices (if, for example, user devices 160-A and 160-B apply the changes in a different order).

If the first result and the second result are the same, there is no need to determine a transformed operation. If however, it is determined that the first result is different from the second result, then, at step 720, a first transformed operation and a second transformed operation are determined such that a first transformed result of applying the first transformed operation to the object instance followed by application of the second transformed operation to the object instance is the same as a second result of applying the second transformed operation to the object instance followed by application of the first transformed operation to the object instance. Processor 375 accordingly transforms the two changes into a pair of transformed operations: a first transformed operation to replace the first character "C" of the word with the characters "CH," and a second transformed operation to replace the fourth character "T" of the word object instance with the character "R" (instead of replacing the third character). Application of the first transformed operation followed by the second transformed operation produces the same result as application of the second transformed followed by the first transformed operation.

At step 730, a visual representation of the object instance is updated based on the first transformed operation and the second transformed operation. Accordingly, collaborative development service 130 transmits to user device 160-A and to user device 160-B respective requests to apply the first and second transformed operations to object instance 874.

User devices 160-A and 160-B receive the requests and apply operational transformation rules 333 to determine which of the requests to apply and which to disregard. If a user device receives from collaborative development service 130 a request to perform a change that it has already performed, the user device disregards the request. Therefore, for example, user device 160-A disregards the request to replace the first character "C" of the word object instance with the characters "CH." User device 160-A therefore applies the second requested operation (to replace the fourth character "T" of the word object instance with the character "R").

User device 160-B also applies operational transformation rules 333 to determine which of the two requests to apply and which to disregard. Because user device 160-B has replaced the third character of the word object instance "T" with the character "R," user device 160-B adds an additional operation to reverse the edit to the third character, and then applies the first and second requested operations to the word.

In another example, suppose that a first instruction is received from a first device to insert text of length X at the beginning of a word object instance of length Y, and a second instruction is received from a second device to insert text at the end of the object instance (after the Yth alphanumeric character), before any request has been transmitted to update the visual representation of the word object instance based on the first instruction. Processor 375, using operational transformation rules 333, transforms the two changes to a pair of transformed operations: a first transformed operation to insert the first text at the beginning of the word object instance, and a second transformed operation to insert the second text after the (X+Y)th alphanumeric character of the word object instance. Requests to perform the transformed operations are transmitted to both devices. This example is discussed further in the illustrative embodiment described below.

Figure 8A:
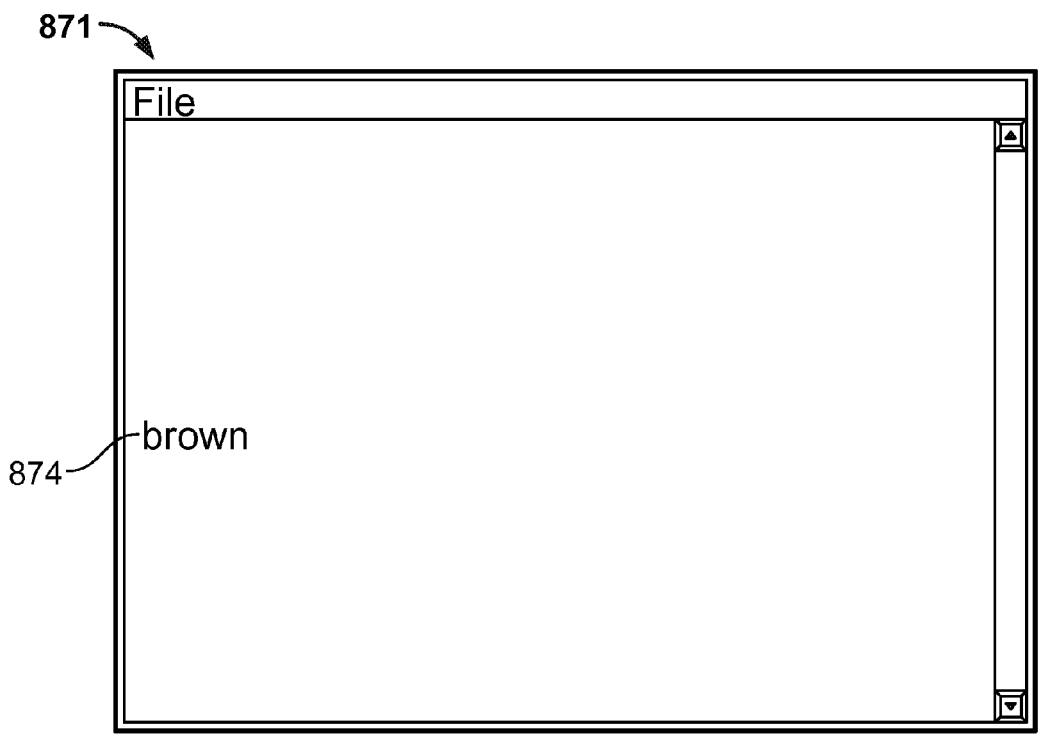
FIG. 8A shows a word object instance displayed on a web page in accordance with an embodiment.

Suppose now that a first user, wishing to edit text document 410, employs user device 160-A to access software application 400 via collaborative development service 130, and accesses text document 410. While editing document 410, the first user types the word "brown." Referring to FIG. 4A, a word object instance 874 is generated, including an ordered list 857 and instance data 878. Word object instance 874 is displayed on display 270 of user device 160-A. For example, browser 210 of user device 160-A may display word object instance 874 on a web page 871, as shown in FIG. 8A.

Figure 8B:
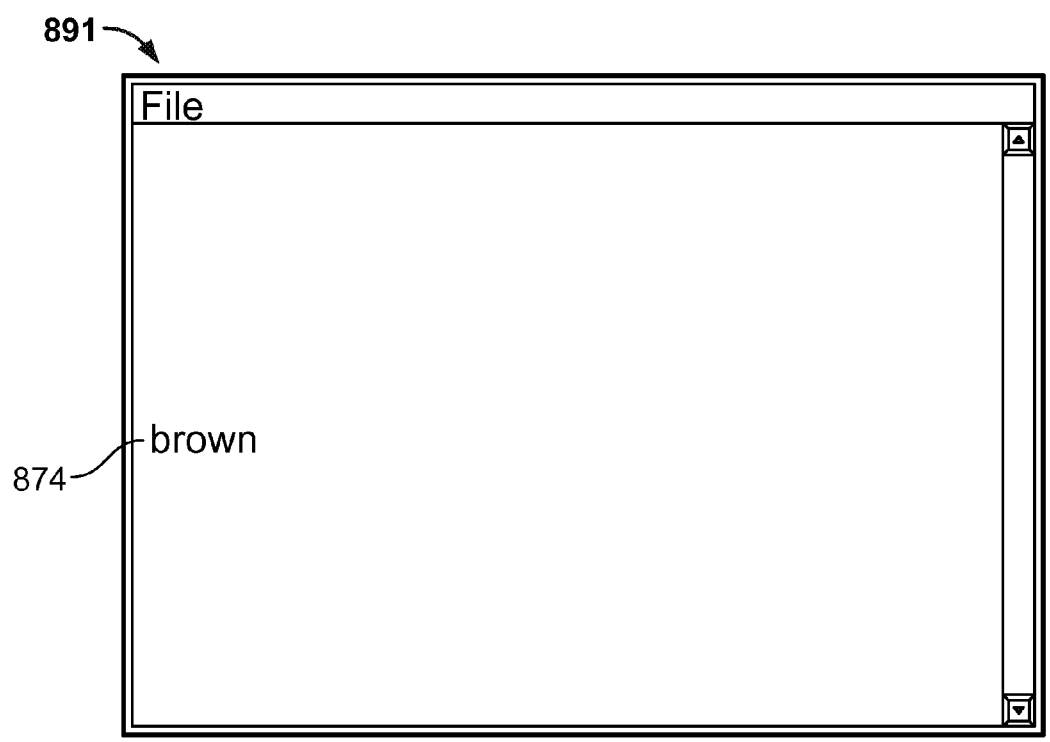
FIG. 8B shows a word object instance displayed on a web page in accordance with an embodiment.

Suppose now that a second user, employing user device 160-B, wishing to edit document 410 in collaboration with the first user, accesses software application 400 via collaborative development service 130, and accesses document 410. Word object instance 874 is also displayed on user device 160-B on a web page 891 similar to web page 871, as shown in FIG. 8B.

In accordance with an embodiment, when instructions are received from a plurality of user devices specifying a plurality of changes to an object instance, a transformed operation is determined based on the changes, and a request is transmitted to a user device to update a visual representation of the object instance based on the transformed operation. In one embodiment, a plurality of transformed instructions may be determined such that application of the transformed instructions, in any order, results in consistent visual representations of the object instance on the plurality of user devices.

Figure 9:
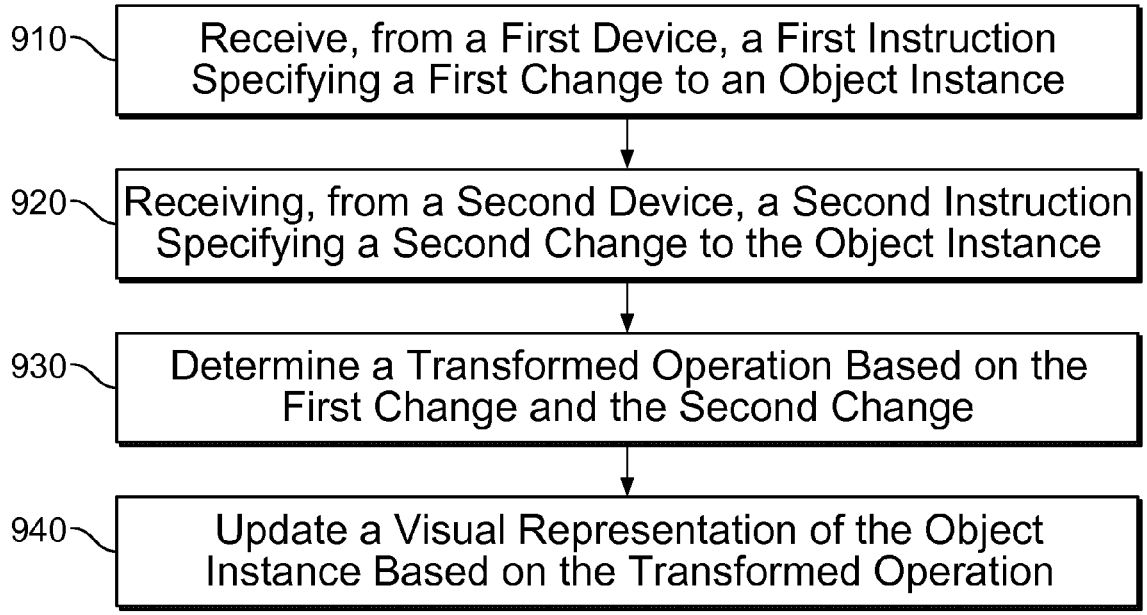
FIG. 9 is a flowchart of a method for providing collaborative development services in accordance with an embodiment.
Figure 10A:
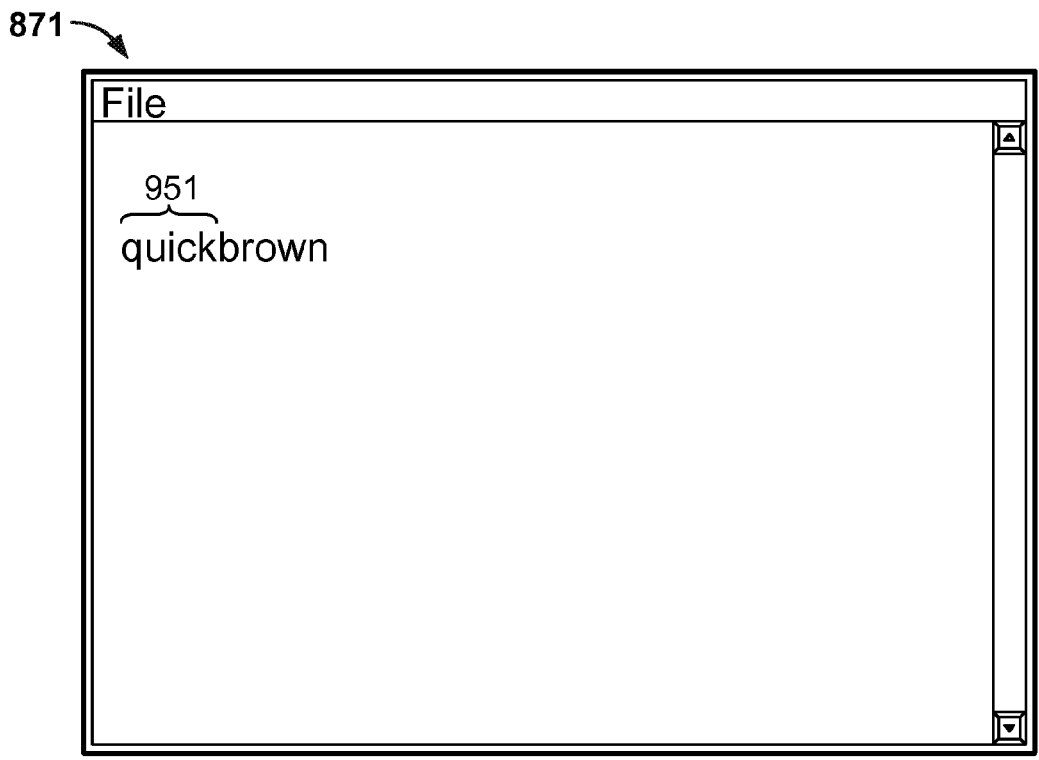
FIG. 10A is an example of a change made to a word object instance displayed on a web page in accordance with an embodiment.

FIG. 9 is a flowchart of a method to update a visual representation of an object instance in accordance with an embodiment. At step 910, a first instruction specifying a first change to an object instance is received from a first device. Referring to FIG. 10A, the first user inserts the text "quick" (951) at the beginning of word object instance 874. Browser 270 of user device 160-A displays the text "quickbrown," as shown in FIG. 10A, and transmits to collaborative development service 130 an instruction to insert the text "quick" at the beginning of word object instance 874. Collaborative development service 130 receives the instruction from user device 160-A.

Figure 10B:
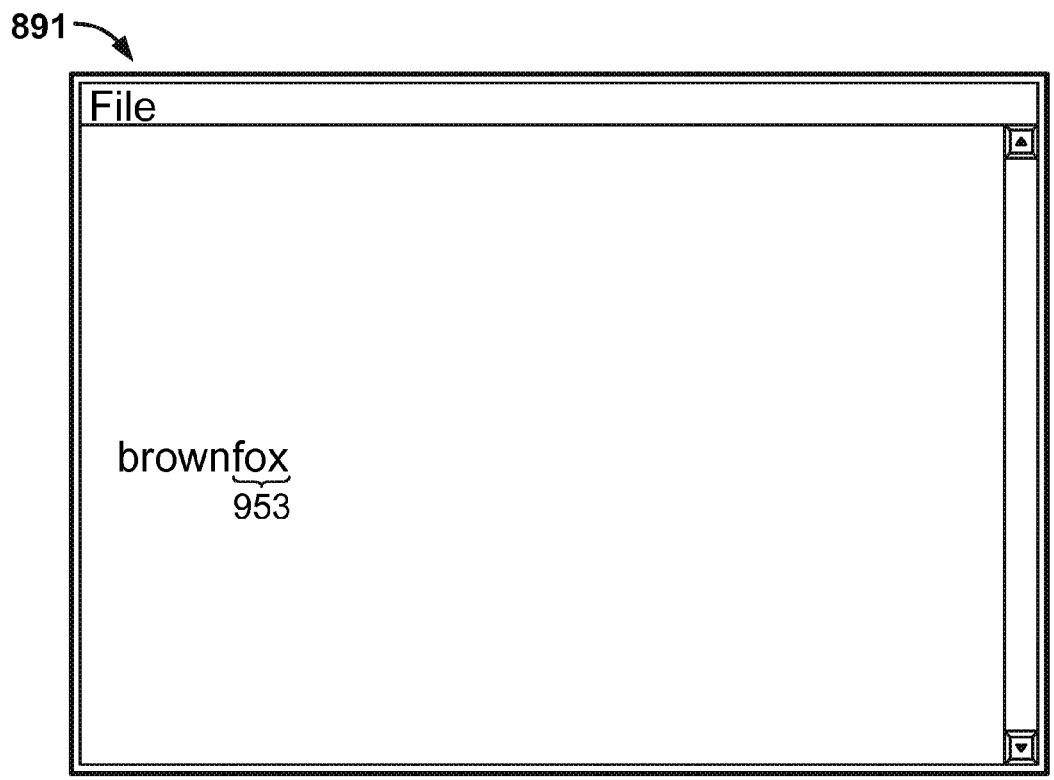
FIG. 10B is an example of a change made to a word object instance displayed on a web page in accordance with an embodiment.

At step 920, a second instruction specifying a second change to the object instance is received from a second device. Referring to FIG. 10B, the second user inserts the text "fox" (953) after the fifth alphanumeric character of word object instance 874. Browser 270 of user device 160-A displays the text "brownfox," as shown in FIG. 10B, and transmits to collaborative development service 130 an instruction to insert the text "fox" after the fifth alphanumeric character of word object instance 874. Collaborative development service 130 receives the instruction from user device 160-A. The first and second instructions are received by processor 375 substantially simultaneously (before any request has been transmitted to either user device to update a visual representation of the object instance).

Processor 375 examines the first change and the second change to determine whether the result of applying the first change followed by the second change is the same as the result of applying the second change followed by the first change. In the illustrative example, the results are different. Accordingly, processor 375 determines that a set of transformed operations is required.

At step 930, a transformed operation is determined based on the first change and the second change. Processor 375 generates a first transformed operation to insert the text "quick" at the beginning of word object instance 874, and a second transformed operation to insert the text "fox" after the tenth alphanumeric character of word object instance 874. The result of applying the first transformed operation followed by the second transformed operation is the same as the result of applying the second transformed operation followed by the first transformed operation.

Figure 11A:
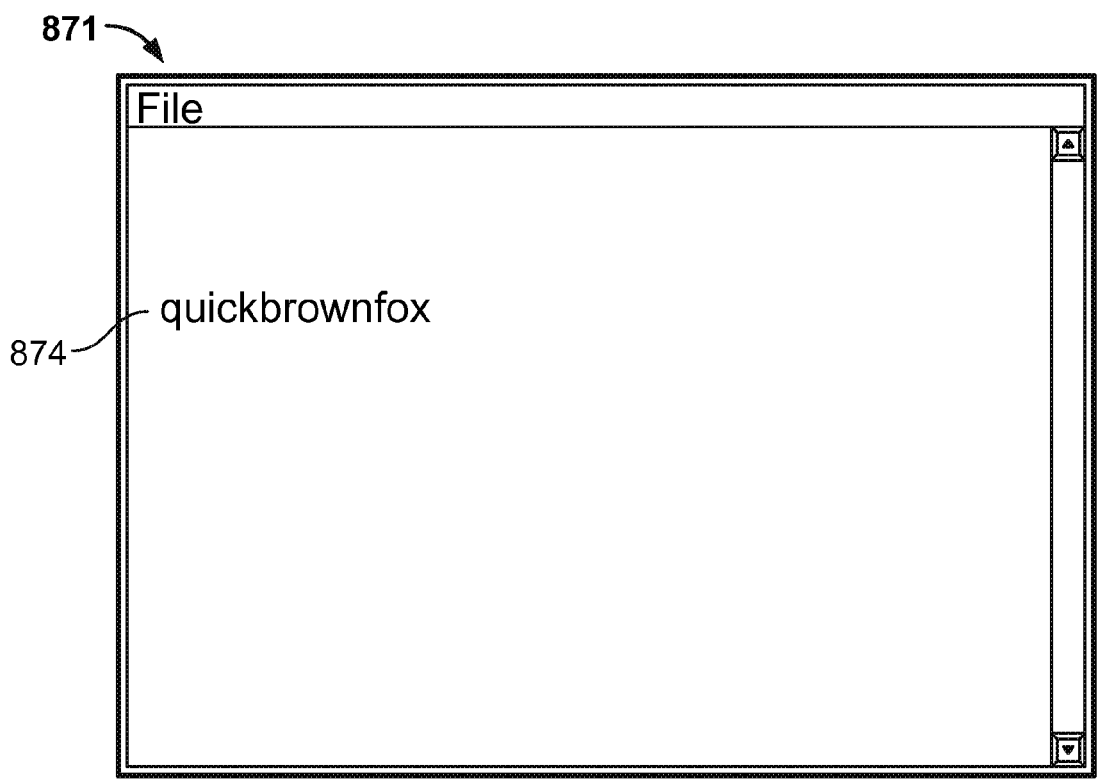
FIG. 11A is an example of an updated word object instance displayed on a web page in accordance with an embodiment.
Figure 11B:
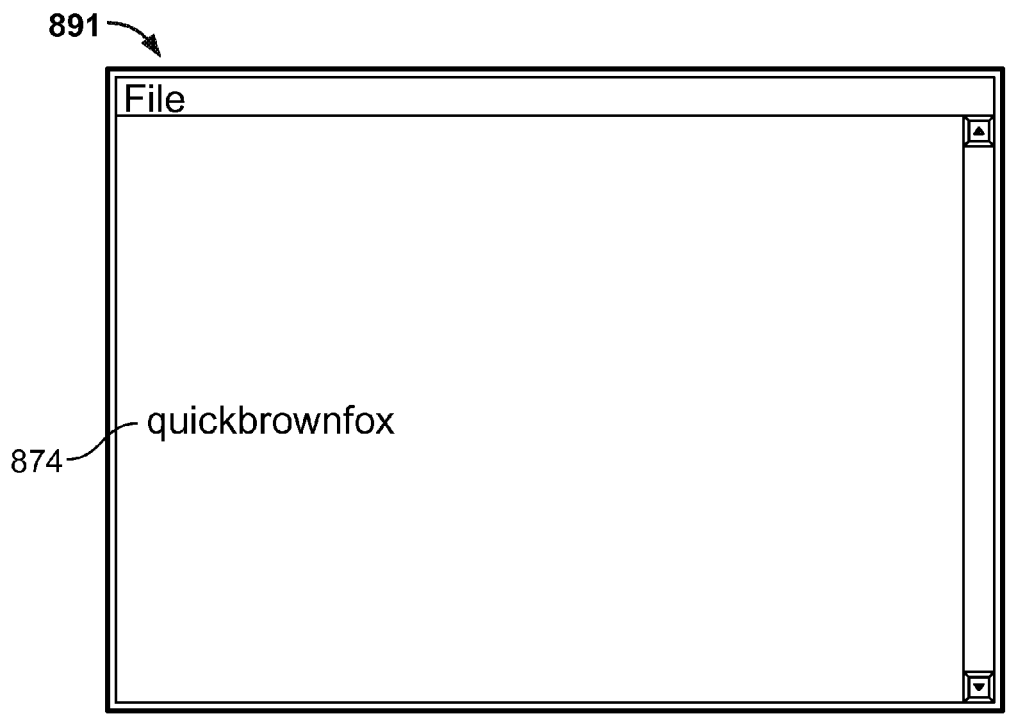
FIG. 11B is an example of an updated word object instance displayed on a web page in accordance with an embodiment.

At step 940, a visual representation of the object instance is updated based on the transformed operation. Collaborative development service 130 transmits a first request to user device 160-A to perform the first and second transformed operations, and a second request to user device 160-B to perform the first and second transformed operations. User device 160-A receives the request and, in response, redraws object instance 874 to effect the first and second transformed operations. User devices 160-B also receives the request and, in response, redraws object instance 874 to effect the first and second transformed operations. FIG. 11A shows updated word object instance 874 displayed on web page 871, displayed on user device 160-A. FIG. 11B shows updated word object instance 874 displayed on web page 891, displayed on user device 160-B.

In accordance with an embodiment, the methods described above are performed in real-time or substantially in real-time. Thus, collaborative development service 130 receives instructions from user devices 160, identifies conflicting changes to a document, determines any necessary transformed operations, and transmits to the user devices requests to apply the transformed operations to the devices' respective visual representations of the document, in real-time, or substantially in real-time, to provide to users a real-time collaborative editing experience.

In another embodiment, changes made by users may be processed in batch. Thus, collaborative development service 130 thus stores instructions as they are received from user devices 160. Collaborative development service 130 from time to time processes a batch of instructions, identifies conflicting changes to a document, determines any necessary transformed operations, and transmits to the user devices requests to apply the transformed operations to the devices' respective visual representations of the document.

The methods and systems described herein advantageously allow users of an online document processing service, and particularly users who wish to employ a third party software application to create and develop a document of any content type, to collaboratively develop and edit the document in real-time. Unlike existing methods and systems, the methods and systems described herein transform changes made by multiple users and display the changes on multiple devices in a consistent manner while avoiding collisions. Furthermore, the changes are displayed on multiple devices in real-time, allowing each user to view not only his or her own changes to the document, but also changes made by other users, in real-time.

In accordance with an embodiment, the redraw optimization methods described above may be combined with the operational transformation methods described above to transform various instructions received from users to generate one or more transformed operations, and then to determine an efficient redraw approach for redrawing an object instance to reflect the one or more transformed operations.

Undo

In accordance with an embodiment, a user who has made a change to a particular object instance may select an undo option to reverse the change. For example, a user may select an undo option from a drop-down menu displayed on display 270 of user device 160.

In one embodiment, each time user device 160 transmits to collaborative development service 130 an instruction to make a change to a particular object instance, user device 160 also stores transiently in memory a reverse instruction in a stack data structure. When the user selects the undo option, the most recent reverse instruction is retrieved from the stack and applied to the visual representation of the object instance on the user's particular user device. In this manner, a user may undo his or her own most recent change without affecting changes made by other users. In another embodiment, a user may selectively undo a change that he or she made within a document (even if the change is not the most recent change made by the user), without affecting any other change.

A redo option is also available to re-apply a change that has been reversed by the selection of the undo option.

Activity/Revision History

Figure 12:
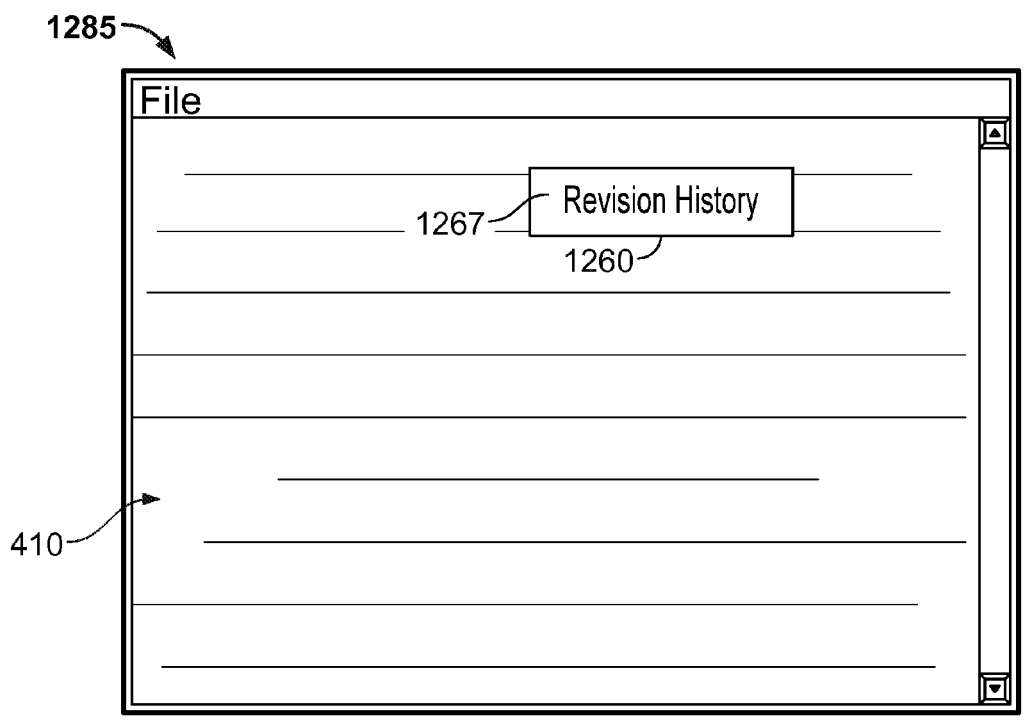
FIG. 12 shows a document and a revision history option displayed on a web page in accordance with an embodiment.
Figure 13:
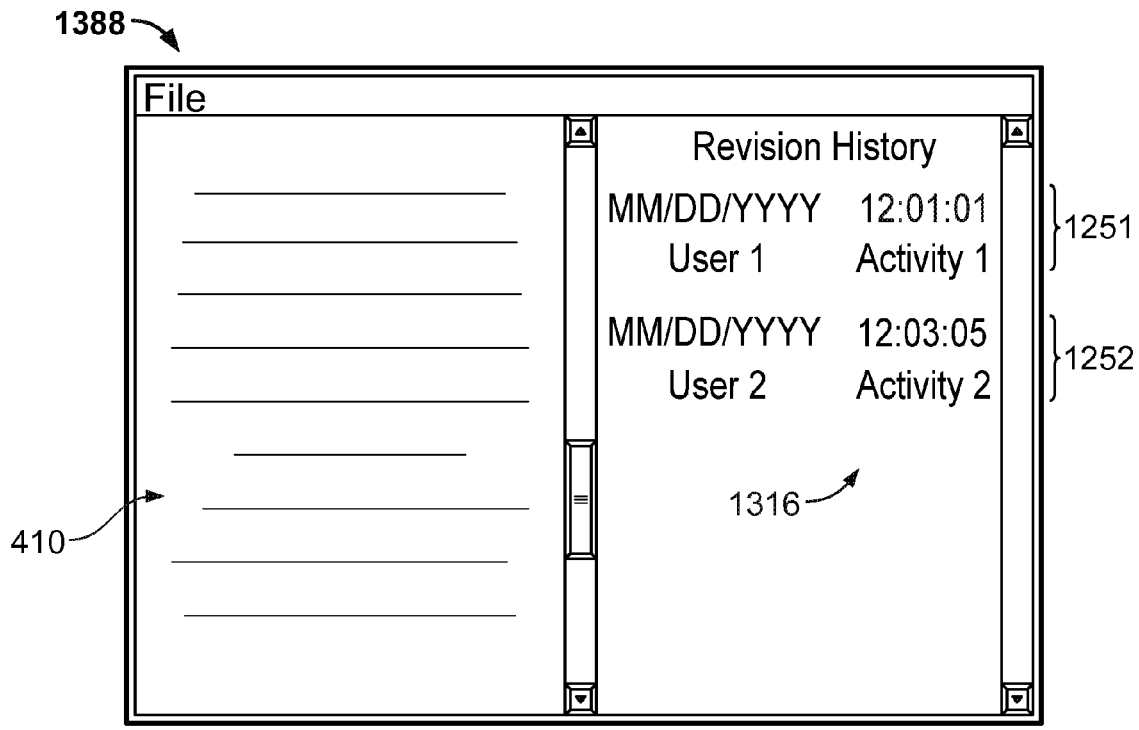
FIG. 13 shows a document and a revision history of the document displayed on a web page in accordance with an embodiment.

In accordance with an embodiment, a user viewing a document may view a list of revisions made to the document. Referring to FIG. 12, for example, a user viewing document 410 on a web page 1285 may press a button on a computer mouse to cause a menu 1260 to appear. In this example, menu 1260 includes a revision history option 1267. When the user selects revision history option 1267, collaborative development service 130 accesses activity table 428 and retrieves information relating to revisions made to document 410. Collaborative development service 130 causes user device 160 to display the document and the document's revision history on a page, such as web page 1388 shown in FIG. 13. A portion of document 410 is shown in a left-hand portion of page 1388. In a right-hand portion of the page, the document's revision history 1316 is shown. For example, the information from rows 451 and 452 of activity table 428, pertaining to the activities of User 1 and User 2, respectively, are displayed.

Comments

Figure 14:
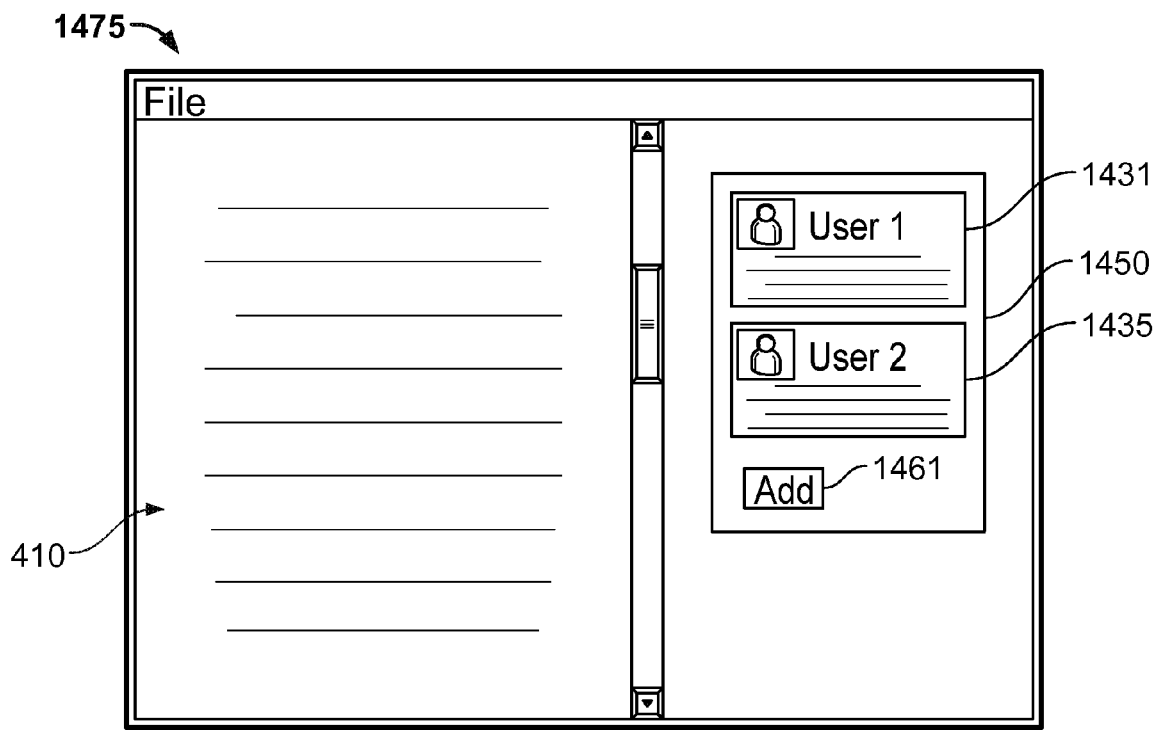
FIG. 14 shows a document and an associated comment thread displayed on a web page in accordance with an embodiment.

In accordance with an embodiment, collaborative development service 130 enables users to maintain a comment thread pertaining to a document, while the users are collaboratively editing the document. Referring to FIG. 14, a web page 1475 may be displayed on a user device 160. In this example, document 410 is displayed in a left-hand portion of the page. A comment thread 1450 is displayed in a right-hand portion of the page. In the illustrative embodiment, comment thread 1450 includes a first comment 1431 generated by a first user and a second comment 1435 generated by a second user. A user may add a comment to the comment thread by selecting an add button 1461 and composing a comment. When a new comment is added, comment thread 1450 is updated. Comment thread 1450 is stored in memory 325, as shown in FIG. 3.

In various embodiments, the method steps described herein, including the method steps described in FIG. 7B and/or FIG. 9, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 7B and/or FIG. 9. Certain steps of the methods described herein, including one or more of the steps of FIG. 7B and/or FIG. 9, may be performed by a server or by another processor in a network-based cloud-computing system. Certain steps of the methods described herein, including one or more of the steps of FIG. 7B and/or FIG. 9, may be performed by a client computer in a network-based cloud computing system. The steps of the methods described herein, including one or more of the steps of FIG. 7B and/or FIG. 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7B and/or FIG. 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 15:
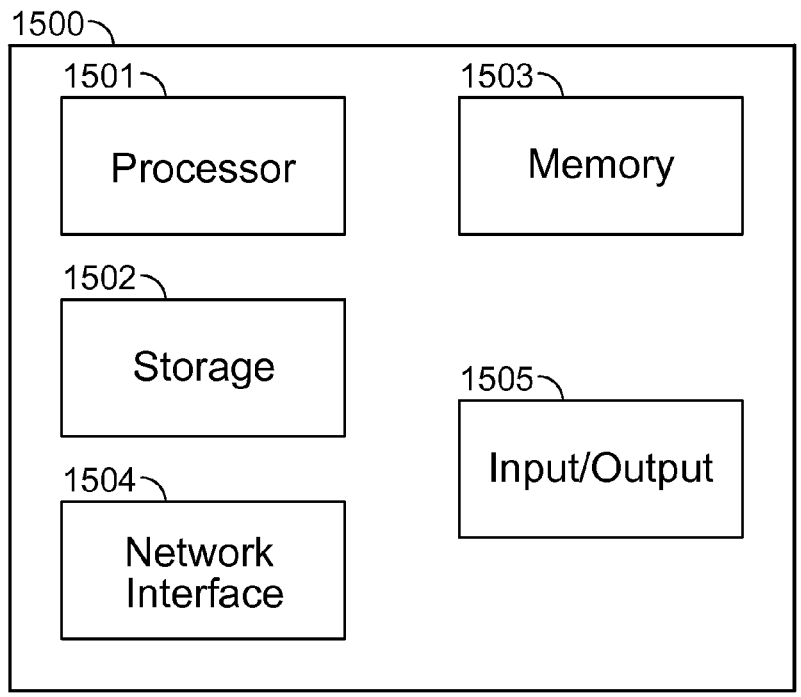
FIG. 15 shows components of a computer that may be used to implement the invention.

A high-level block diagram of an exemplary computer that may be used to implement systems, apparatus and methods described herein is illustrated in FIG. 15. Computer 1500 includes a processor 1501 operatively coupled to a data storage device 1502 and a memory 1503. Processor 1501 controls the overall operation of computer 1500 by executing computer program instructions that define such operations. The computer program instructions may be stored in data storage device 1502, or other computer readable medium, and loaded into memory 1503 when execution of the computer program instructions is desired. Thus, the method steps of FIG. 7B and/or FIG. 9 can be defined by the computer program instructions stored in memory 1503 and/or data storage device 1502 and controlled by the processor 1501 executing the computer program instructions. For example, the computer program instructions can be implemented as computer executable code programmed by one skilled in the art to perform an algorithm defined by the method steps of FIG. 7B and/or FIG. 9. Accordingly, by executing the computer program instructions, the processor 1501 executes an algorithm defined by the method steps of FIG. 7B and/or FIG. 9. Computer 1500 also includes one or more network interfaces 1504 for communicating with other devices via a network. Computer 1500 also includes one or more input/output devices 1505 that enable user interaction with computer 1500 (e.g., display, keyboard, mouse, speakers, buttons, etc.).

Processor 1501 may include both general and special purpose microprocessors, and may be the sole processor or one of multiple processors of computer 1500. Processor 1501 may include one or more central processing units (CPUs), for example. Processor 1501, data storage device 1502, and/or memory 1503 may include, be supplemented by, or incorporated in, one or more application-specific integrated circuits (ASICs) and/or one or more field programmable gate lists (FPGAs).

Data storage device 1502 and memory 1503 each include a tangible non-transitory computer readable storage medium. Data storage device 1502, and memory 1503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1505 may include peripherals, such as a printer, scanner, display screen, etc. For example, input/output devices 1505 may include a display device such as a cathode ray tube (CRT) or liquid crystal display (LCD) monitor for displaying information to the user, a keyboard, and a pointing device such as a mouse or a trackball by which the user can provide input to computer 1500.

Any or all of the systems and apparatus discussed herein, including collaborative development service 130, user device 160, and components thereof; including web browser 210, display 270, operational transformation rules 333, processor 375, and memory 325, may be implemented using a computer such as computer 1500.

One skilled in the art will recognize that an implementation of an actual computer or computer system may have other structures and may contain other components as well, and that FIG. 15 is a high level representation of some of the components of such a computer for illustrative purposes.

In accordance with an embodiment, the systems and methods described above may be used to provide a collaborative development service to software developers and to end users. Collaborative development service 130 provides a platform for developers to create and edit a software application. After the software application has been developed, the software application may be maintained at a third party website, such as third party website 112, for example. In one embodiment, collaborative development service 130 is implemented using software residing on a server, for example.

In one embodiment, third party website 112 is associated with an address, such as a Uniform Resource Locator (URL). A link representing the URL may be placed in advertisements or on selected webpages to facilitate the use of the third party software application by end users. A user wishing to access the third party software application may do so by clicking on the link associated with the URL, for example. When a user, employing a user device 160, clicks on such a link, collaborative development service 130 executes the third party software application and allows the user to access functionality of the software application via an embedded frame displayed on the user's device.

Figure 16A:
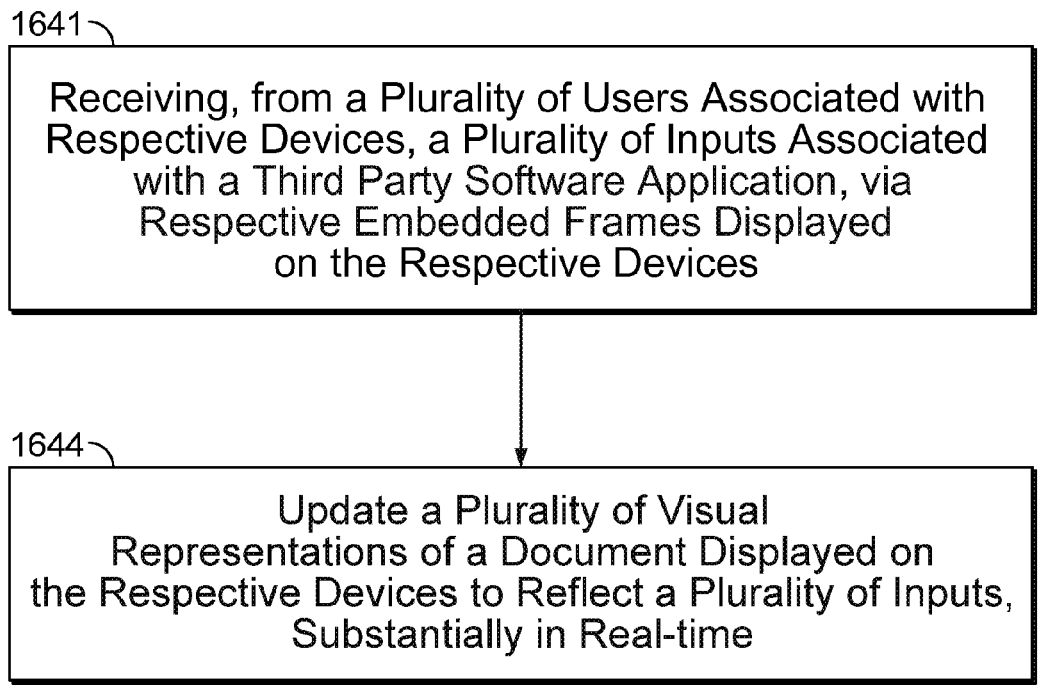
FIG. 16A is a flowchart of a method for updating a visual representation of a document in accordance with an embodiment.

Multiple users may use the software application to collaboratively create and edit a document. FIG. 16A is a flowchart of a method for providing collaborative development services in accordance with an embodiment. At step 1641, collaborative development service 130 receives, from a plurality of users associated with respective devices, a plurality of inputs associated with a third party software application, via respective embedded frames displayed on the respective devices. At step 1644, collaborative development service 130 updates a plurality of visual representations of the document displayed on respective devices to reflect a plurality of inputs substantially in real-time.

In one embodiment, one or more developers may create a software application based on a data model created in a manner such as that described above. The developers may use a pre-built set of data models, mutations, and supporting libraries that may enable them to quickly build highly functional collaborative data models using the collaborative development system platform. These data models are operational transformation ready, highly customizable and provide built-in support for developer-defined operations. These data models also provide built-in support for other features such as those described above (e.g., undo/redo, etc.).

Figure 16B:
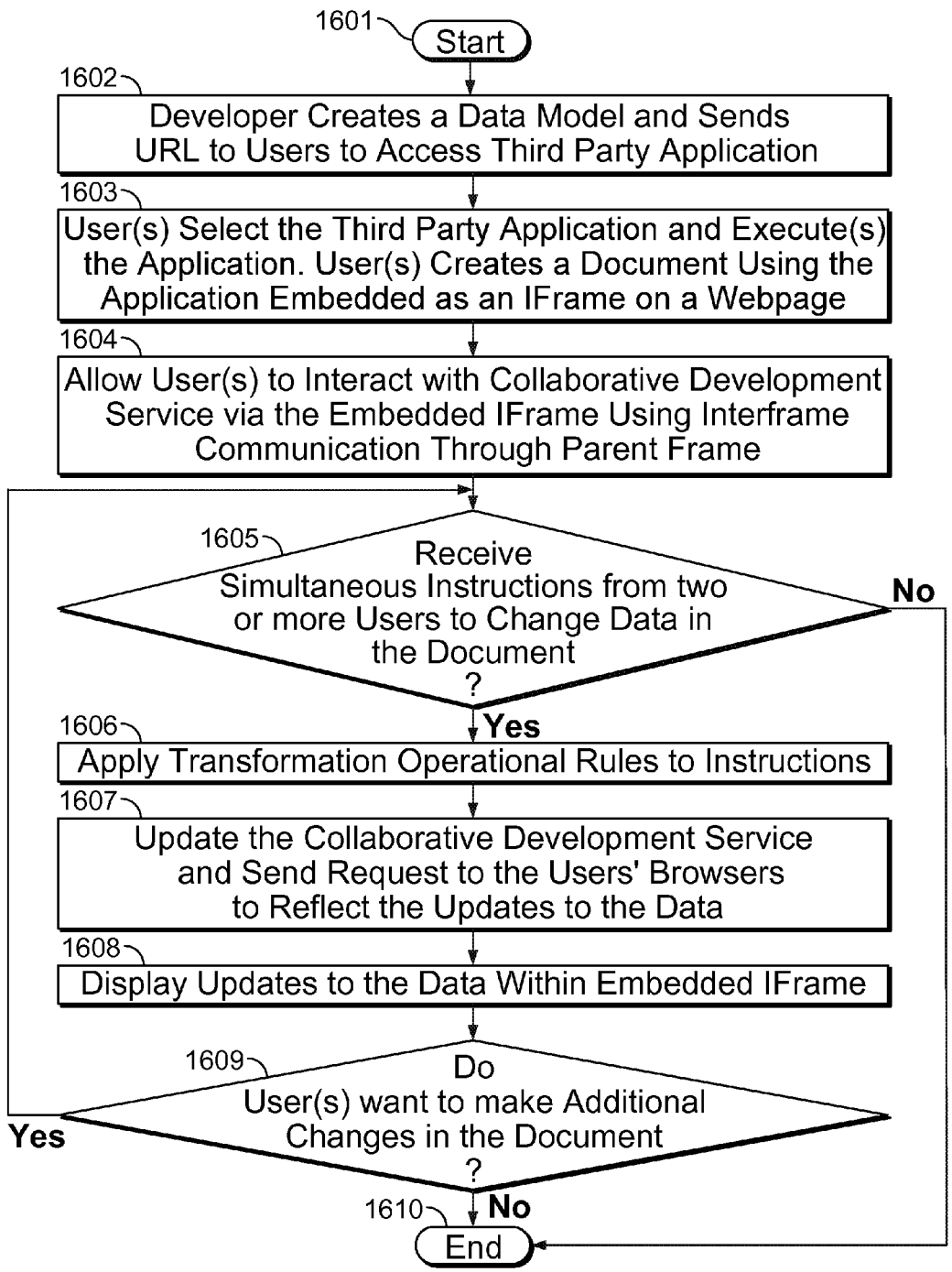
FIG. 16B is a flowchart of a method for providing collaborative development services in accordance with an embodiment.

FIG. 16B is a flowchart of a method of providing collaborative development service in accordance with an embodiment. At step 1601, the method starts. At step 1602, a developer creates a data model and constructs a third party application in a manner such as that described above. The developer then provides a URL to users who wish to access the third party application. At step 1603, the users select the third party application (e.g., by clicking on the URL) and execute the application. Collaborative development service 130 causes the third party software application to be executed and provides access to the application via an embedded frame. For example, the users may create a document using the application which is embedded as an IFrame on a webpage. At step 1604, the users interact with collaborative development service 130 via the embedded IFrame, using interframe communication through a parent frame. At step 1605, a determination is made whether substantially simultaneous instructions have been received from two or more users to change data in the document. If not, the method ends, at step 1610. If yes, transformation operational rules are applied to the instructions, at step 1606. At step 1607, collaborative development service 130 is updated, and requests are sent to the users' browsers to reflect the updates to the data. At step 1608, updates to the data are displayed within embedded IFrame in each user's display. At step 1609, a determination is made whether or not the users wish to make additional changes in the document. If so, the process returns to step 1605. If not, the process ends at step 1610.

Figures 17A, 17B:
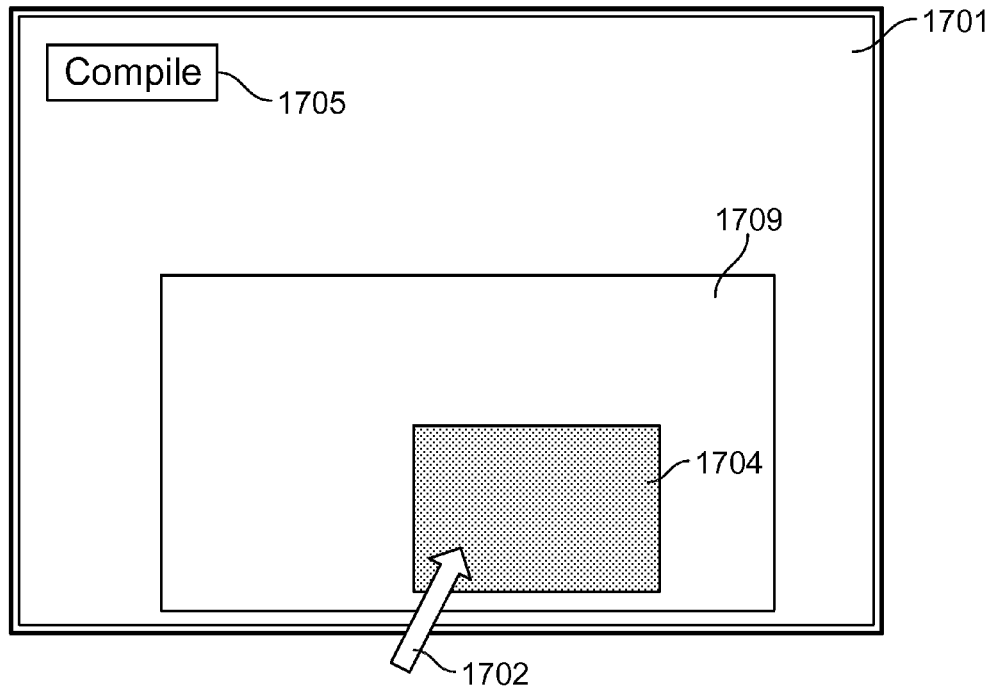
FIG. 17A shows an interface that may be used to develop a software application in accordance with an embodiment.
FIG. 17B shows an example of code used to develop a software application in accordance with an embodiment.

FIG. 17A shows a user interface 1701 that may be used by a developer to construct a software application in accordance with an embodiment. A developer provides input 1702 in order to build a data model. A developer may enter code in region 1709. In the illustrative embodiment, the developer inputs code 1704 to create a portion of the data model. Other code may be input anywhere in 1709. Additionally, the coding portion 1704 and/or 1709 may be displayed within a portion of an application and the application may provide menu buttons such as compile button 1705. An example of code that may be used is shown in FIG. 17B. The code shown is for exemplary purposes; any coding language and/or technique may be used.

As indicated by the code line 1706, the code may contain comments enclosed in between "//" or blocks of text enclosed in "/* */" characters, as is known. The data model code may also contain a package specifier indicating the closure package to which each data type in the file should be assigned when the file is compiled and data type stanzas consisting of an optional list of @prefixed annotations, a data type name, followed by a pair of braces enclosing a list of field specifications.

Annotations such as @Root which indicates the root data type, shown by code line 1707, are supported by the collaborative development service 130. In one embodiment, exactly one data type must be marked "@Root" and a compilation warning is displayed specifying a data type that is not reachable from @Root.

In one embodiment, field specifications in the code may consist of a data type, a field name, and a semicolon. Acceptable data types include any primitive type name, map, array (optionally parameterized) and any data type name specified in the data model definition. Field names and namespaces must be unique across all files in a compilation run. Package specifications are merely a convenience for the compiled output. Parameterized array data type may be followed by angle brackets containing another data type. This indicates that this array must contain values of a particular type. This may influence the compiler output and adds another level of runtime checking to the compiled code.

When the developer wishes to compile the code, he or she may select an option such as "Compile" button 1705, shown in FIG. 17A. Any compiler may be used to compile the code. In one embodiment, the compiler may accept 0 or more data model files. The compiler may also accept a compressed collection of 0 or more data model files and in return, produce a compressed list of outputs.

Figure 17C:
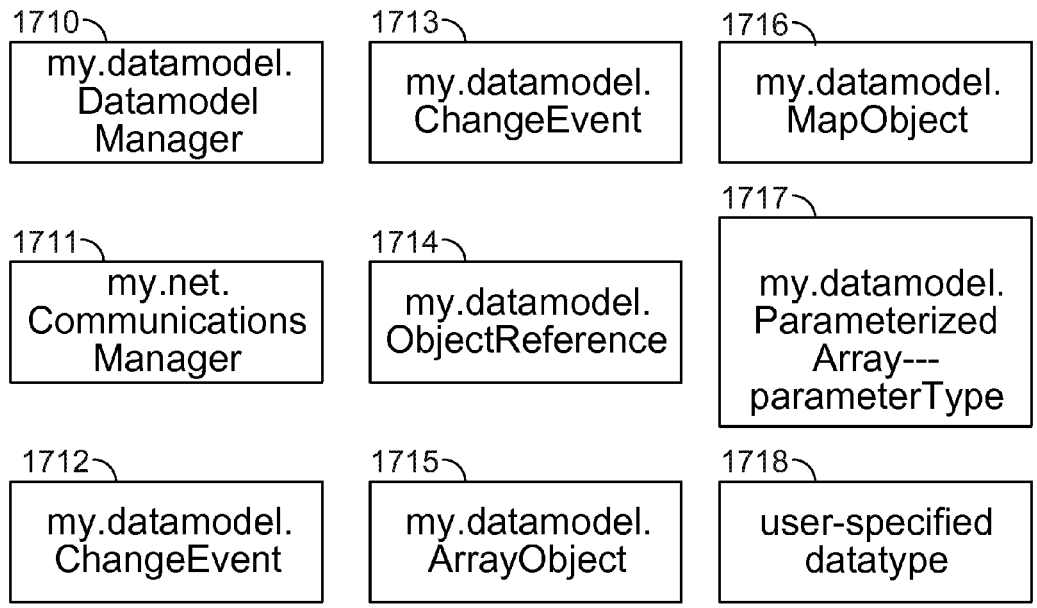
FIG. 17C shows various output classes that may result from compilation of a software application in accordance with an embodiment.

In one embodiment, for any collection of inputs, the compiler produces the standard outputs as shown in FIG. 17C. These outputs are discussed below.

Output 1710 represents my.datamodel.DatamodelManager, which is a standard singleton class that provides access to the Root data model object, a data model factory registry (to allow developers to use their own subclasses of generated data model objects), support for developer-defined user operations, and undo/redo support. The DatamodelManager is a required constructor parameter for all other compiler-generated data model classes. At least one customized method may be included to have the return type specified in the data model definition.

Output 1711 represents my.net.CommunicationsManager, which is a standard singleton class that provides hooks for setting up network communication with the collaborative development service 130 and loading the initial data models.

Output 1712 represents my.datamodel.ChangeEvent, which is the event fired when a datamodel object changes.

Output 1713 represents my.datamodel.DatamodelObject, which is the base class of all generated data types. This class includes basic capabilities such as event registration and low-level integration with the DatamodelManager.

Output 1714 represents my.datamodel.ObjectReference, which is a wrapper object that represents a reference to a non-primitive object. This object=contains the string identification (id) of the referenced object.

Output 1715 represents my.datamodel.ArrayObject, which is a subclass of DatamodelObject used to model unparameterized arrays.

Output 1716 represents my.datamodel.MapObject, which is a subclass of DatamodelObject used to model maps.

The compiler may also generate custom files based on a developer's data model definition files. These custom files are described as follows.

File 1717 represents my.datamodel.Parameterized Array - - - parameterType which is a subclass of ArrayObject. For each parameterized array type in the data model definition file, a parameterized array type is created. The methods of ParameterizedArray objects are typed to enforce the proper content type, and they include runtime checking to ensure that only objects of the correct type are inserted into the array.

File 1718 represents a user-specified data type which is a subclass of DatamodelObject that is created for each user-defined type in the file. This file contains getter and setter methods for each field in the data model definition. The setter methods are tied into the DatamodelManager, so that whenever a field is "set", the appropriate mutation is generated, applied to the data model, added to the undo stack, and communicated to the server. Every DatamodelObject may support two closure event types: my.datamodel.ChangeEvent.Type.CHANGED, which fires whenever the object changes, and my.datamodel.ChangeEvent.Type.DESCENDANT_CHANGED, which fires whenever any descendant object changes.

The ChangeEvent contains the mutations that represent the change that occurred. Because object graphs can be arbitrarily complex, the DESCENDANT_CHANGED event may have complex behavior. In a cyclic object graph, a change to a parent object may cause a DESCENDANT_CHANGED event to fire. This event may only fire once per object per mutation, even if the change affects an object that is a descendant of the target object via multiple paths.

Embedding A Software Application in an IFrame

After the developer compiles a software application, the developer may offer the software application for sale, offer the software application for use, or otherwise make the software application available, to end-users. In one embodiment, a software application may be uploaded onto a third party website, where other users may access it in a manner described below. The software application, a portion of the application, and/or a document created using the application may be embedded within a website or webpage hosted by collaborative development service 130, in a known manner. For example, a software application may be embedded as an IFrame on the webpage. Other frames and/or applications may be embedded onto the webpage. In one embodiment, the contents of the webpage with the exception of the embedded IFrame are static and/or the same for all applications. The contents may include but are not limited to items such as hyperlinks, menu buttons, graphics, text, etc. Methods of embedding a software application, or a document, as an IFrame on a webpage are known.

When collaborative development service 130 embeds a third party software application on a webpage, a user may view the application running within the IFrame, and any related documents, on his/her browser. In one embodiment, the application may be a word processing application and the user may create and/or otherwise access a document using the word processing application. In another embodiment, the application may be a music editor and the client may create and/or otherwise access an existing or new notes editor document. The notes editor document may contain many different fields which may be edited by the user. Other types of applications and documents may be used.

Use of Third Party Software Application by End-Users

In one embodiment, one or more users may access and/or use a third party software application via collaborative development service 130. For example, a third party software application may be created by one or more developers and made available via a third party website. The developers may, for example, advertise the application on the third party website or webpage. In another embodiment, the third party software application, or a Uniform Resource Locator (URL) associated with the software application, may be listed, or otherwise made available for purchase or use, in a software application store available online. A user may access the third party software application by clicking on a URL associated with the application, for example. In one embodiment, when a user(s) employing a user device 160 clicks or otherwise accesses the URL, the user(s) is/are directed to a webpage hosted by collaborative development service 130.

Figure 18:
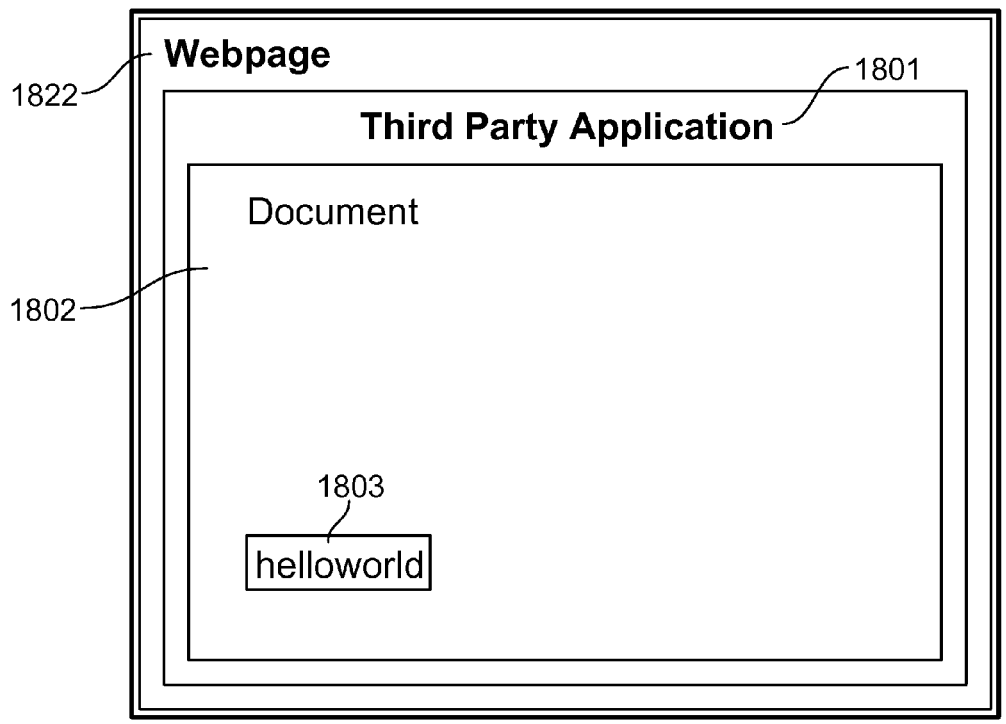
FIG. 18 shows a third party application, and a document created using the third party application, displayed in a frame embedded in a webpage in accordance with an embodiment.

FIG. 18 shows a third party software application 1801 embedded on a webpage 1822, which may be displayed on a user device 160. The user(s) may use the third party application 1801 to create a document 1802, which may be displayed to the users in the same embedded IFrame or in a second IFrame on the webpage hosted by collaborative development service 130. In one embodiment, document 1802 may be visible to the users while third party application 1801 may be running in the background and thus invisible to the users. Therefore, third party application 1801 illustrated in the figures may or may not be visible to a user.

In one embodiment, when the user clicks on a URL associated with the third party software application, the user downloads the application or otherwise loads the application onto his/her user device. The application may then be represented as an icon, or appear as a new menu item in a list of items on a webpage hosted by the collaborative development service 130. The webpage may list, for example, all applications purchased and/or downloaded by the user. The application is loaded onto the user's browser as an embedded IFrame in a manner such as that described above, and a document created using the application may be accessed by the user at anytime using any one or combination of a number of devices having access to the Internet.

Figure 19A:
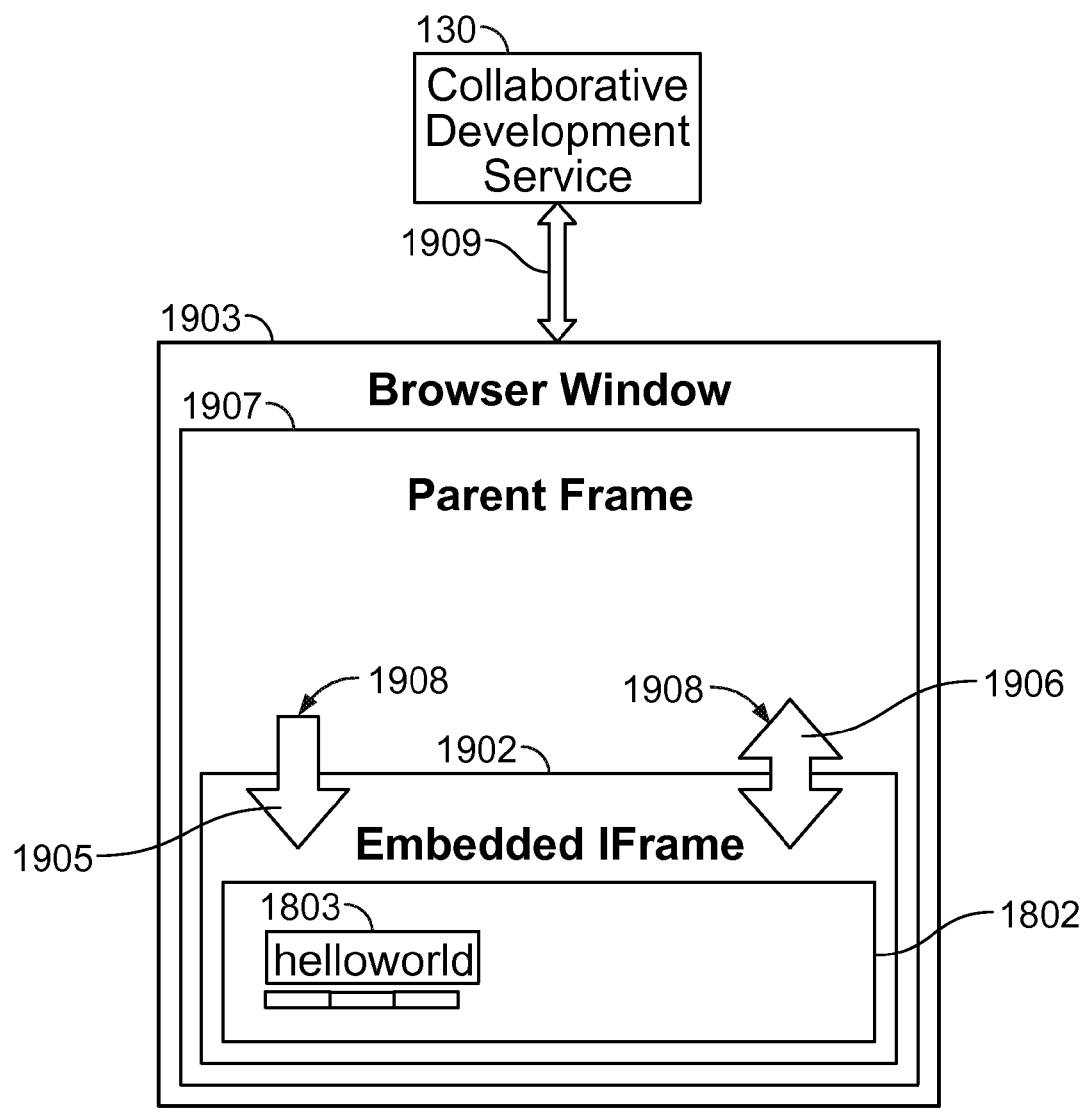
FIG. 19A illustrates an example of interframe communication in accordance with an embodiment.

In an embodiment illustrated in FIG. 19A, collaborative development service 130 communicates with a user's browser window 1903, which displays a parent webpage 1907 (the parent frame) and an embedded IFrame 1902. In one embodiment, the webpage is hosted on collaborative development service 130, while the source of the IFrame (e.g., the third party application) is hosted on a third party server associated with the third party application.

Browser window 1903 includes a parent frame 1907 and an embedded IFrame 1902. In one embodiment, browser window 1903 may include one or more frames that contain the same universal information as browser window 1903 (or parent frame 1907), regardless of what application is embedded within IFrame 1902.

Browser window 1903 communicates with embedded frames using interframe communication. In order for browser window 1903 to communicate with embedded IFrame 1902, event notifications are sent in the direction shown by 1905. Event notifications may be sent without an explicit request and include mutations, as described above, received from collaborative development service 130 and information about users that have joined and/or left the document. This one-way communication of events allows for a secure system.

Remote procedure calls (RPCs) 1906 are sent to and/or from the browser window 1903 to embedded IFrame 1902. The RPCs may be in the form of requests that are sent from a developer code/application document to parent frame 1907. The RPCs may also be responses that are sent back from the parent code to the developer code including document mutations, request for information about users, etc. Methods of interframe communication are known.

Figure 19B:
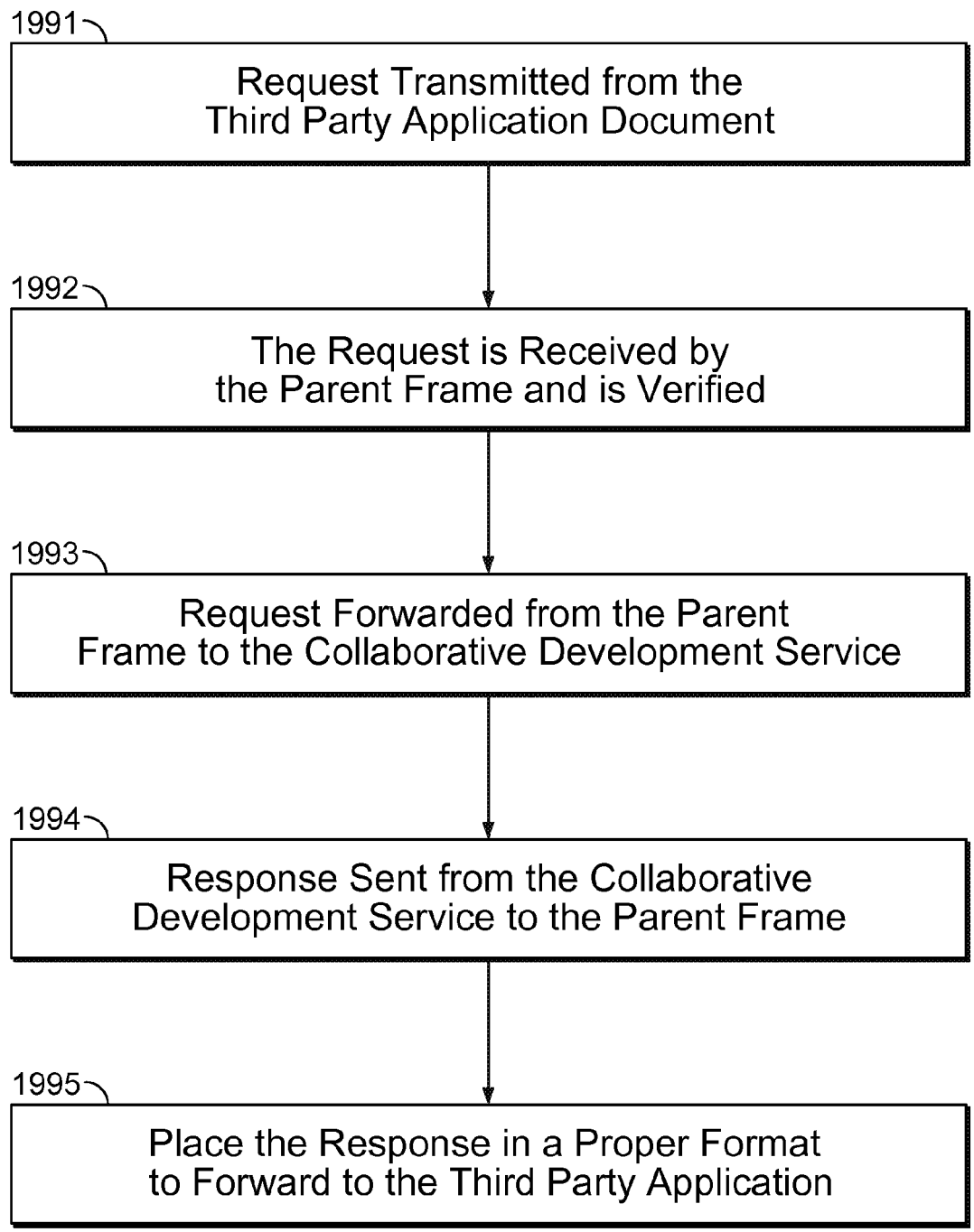
FIG. 19B is a flowchart of a method of providing collaborative development services in accordance with an embodiment.

In one embodiment, a third party application and/or a document embedded on IFrame 1902 communicates with parent frame 1907 using cross-frame messaging which passes messages between parent frame and collaborative development service 130. In one embodiment, for purposes of security, mutations generated by a third party application embedded in the IFrame are prohibited from directly communicating with collaborative development service 130. In this way, security measures are implemented to ensure that untrusted, unverified or otherwise unsecure data is not transmitted directly to collaborative development service 130. FIG. 19B is a flowchart of a method of communicating between a third party application embedded in an IFrame and collaborative development service 130. First, a request is transmitted from the third party application document embedded in IFrame, at step 1991. The request may be a question or a mutation on the third party application document. For example, the request may contain a mutation or a question regarding the users that are accessing or have accessed the third party application. The request may be a stream of information or any other type of request. The request is sent from the third party application document embedded in the IFrame to parent frame 1907 and/or webpage via interframe communication (shown as 1908 in FIG. 19A). The request is received by parent frame 1907 and is verified and/or otherwise determined to be secure, at step 1992.

The request is then forwarded from the trusted parent frame 1907 to collaborative development service 130, where the request may be handled appropriately, at step 1993. In one embodiment, the request (or message containing the request)

is communicated via asynchronous Javascript and Extensible Markup Language (XML) (shown as 1909 in FIG. 19A). Additionally, a response to the request is also communicated via asynchronous JavaScript and XML (shown as 1909 in FIG. 19A). The response is sent from collaborative development service 130 to parent frame 1907, at step 1994, which places the response in a proper format to forward to the third party application, at step 1995.

In one embodiment, a one-way communication is made from parent frame 1907 to the third party application. This communication may relate to any event including a notification sent without an explicit request including mutations received from collaborative development service 130, and information about users (whether a user has joined or left a third party application document), etc. The methods and systems as depicted by FIGS. 19A and 19B provide real-time scripting.

Application of Operational Transformation Rules

Referring again to FIG. 18, a plurality of users use the functionality of third party application 1801 to create a document 1802. Within the document, the users may define instances of particular objects, including word object instances. In an embodiment illustrated by FIG. 20, the users instantiate a word object "helloworld" 1803.

Figure 20:
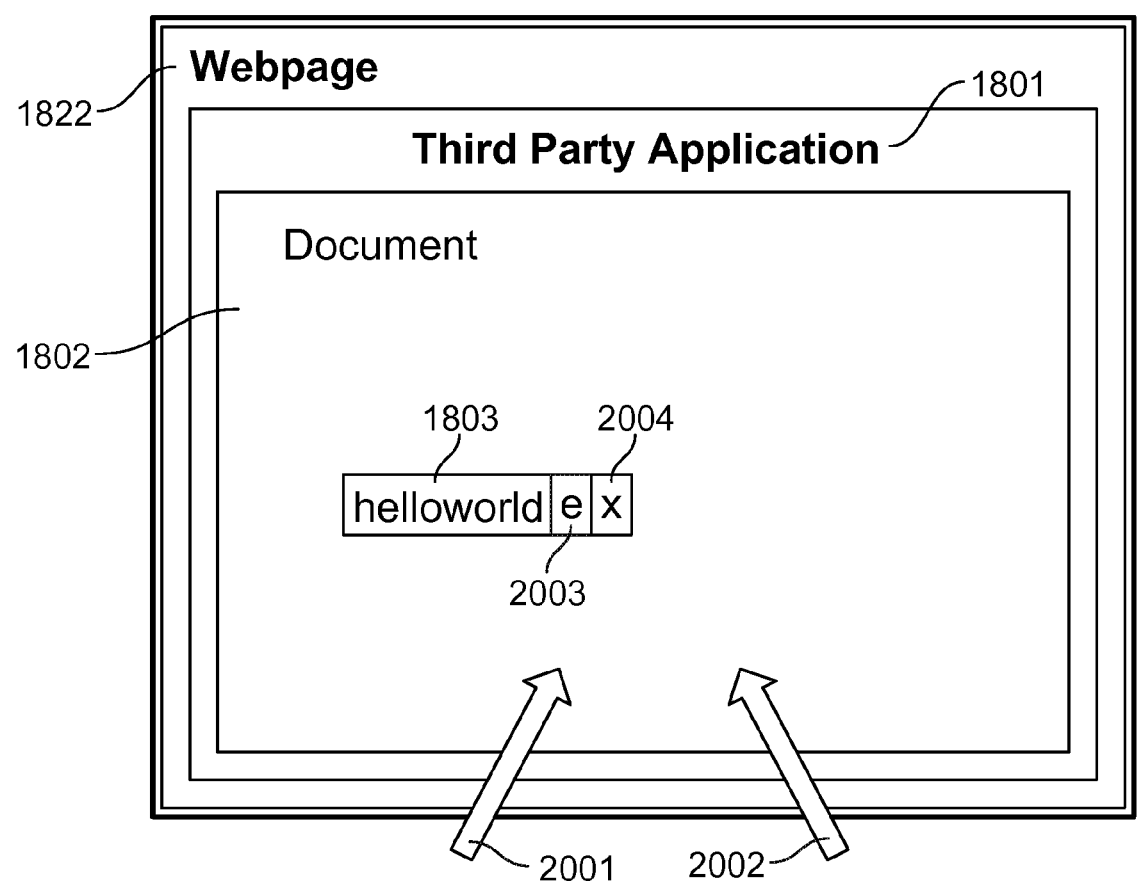
FIG. 20 shows a document displayed in an embedded frame in accordance with an embodiment.
Figure 21A:
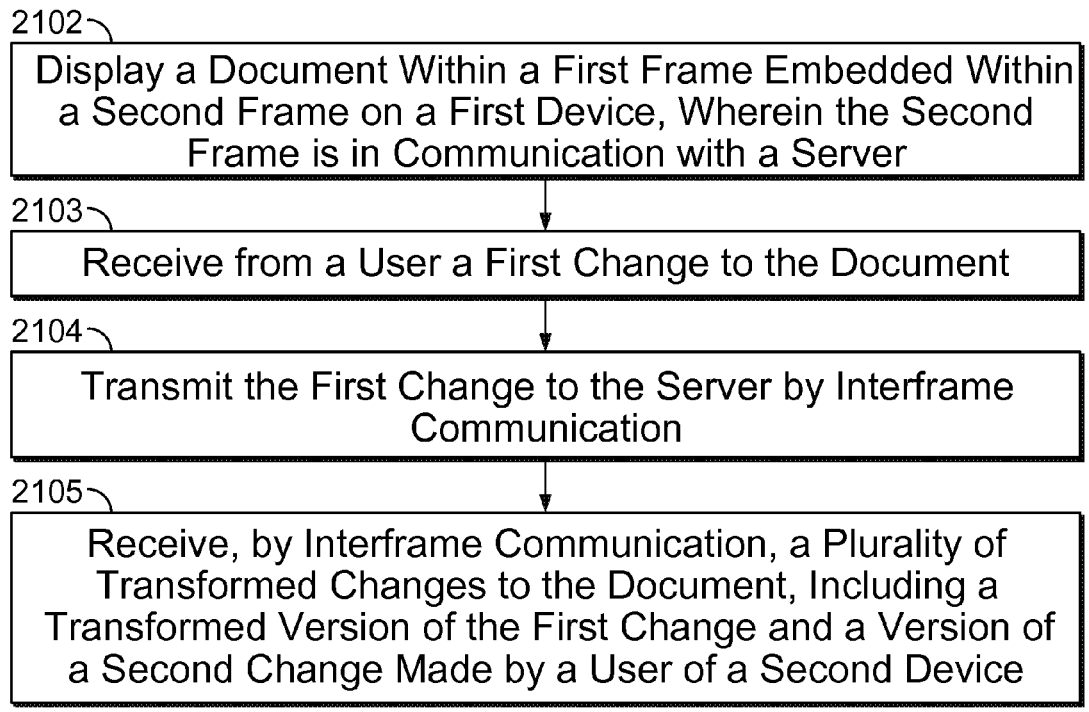
FIG. 21A is a flowchart of a method of providing collaborative development services in accordance with an embodiment.
Figure 21B:
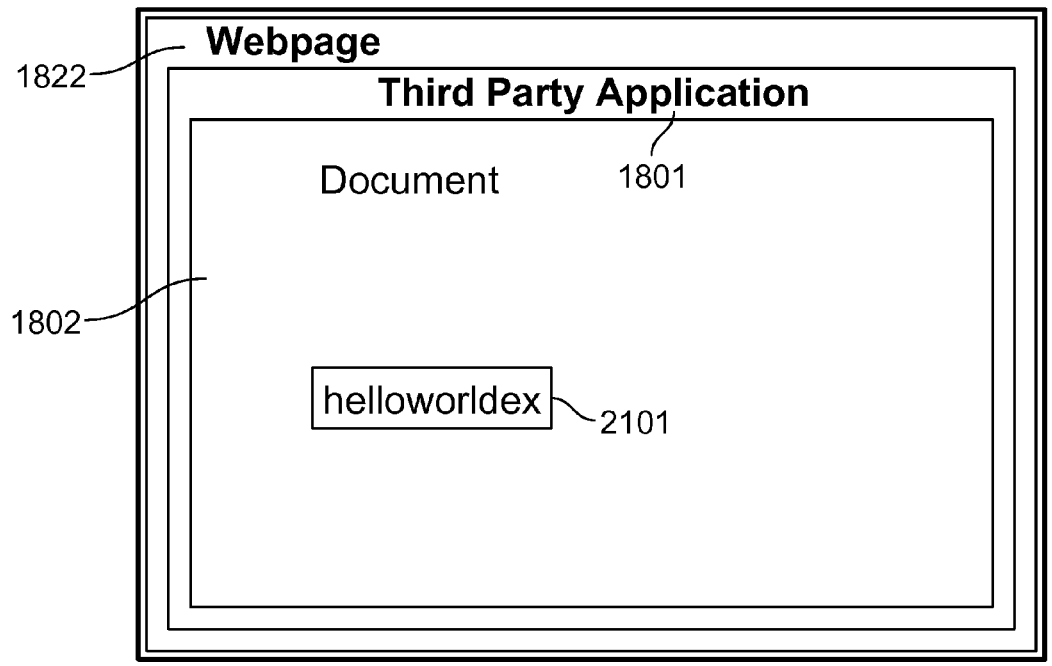
FIG. 21B shows a document displayed in an embedded frame in accordance with an embodiment.
Figure 22:
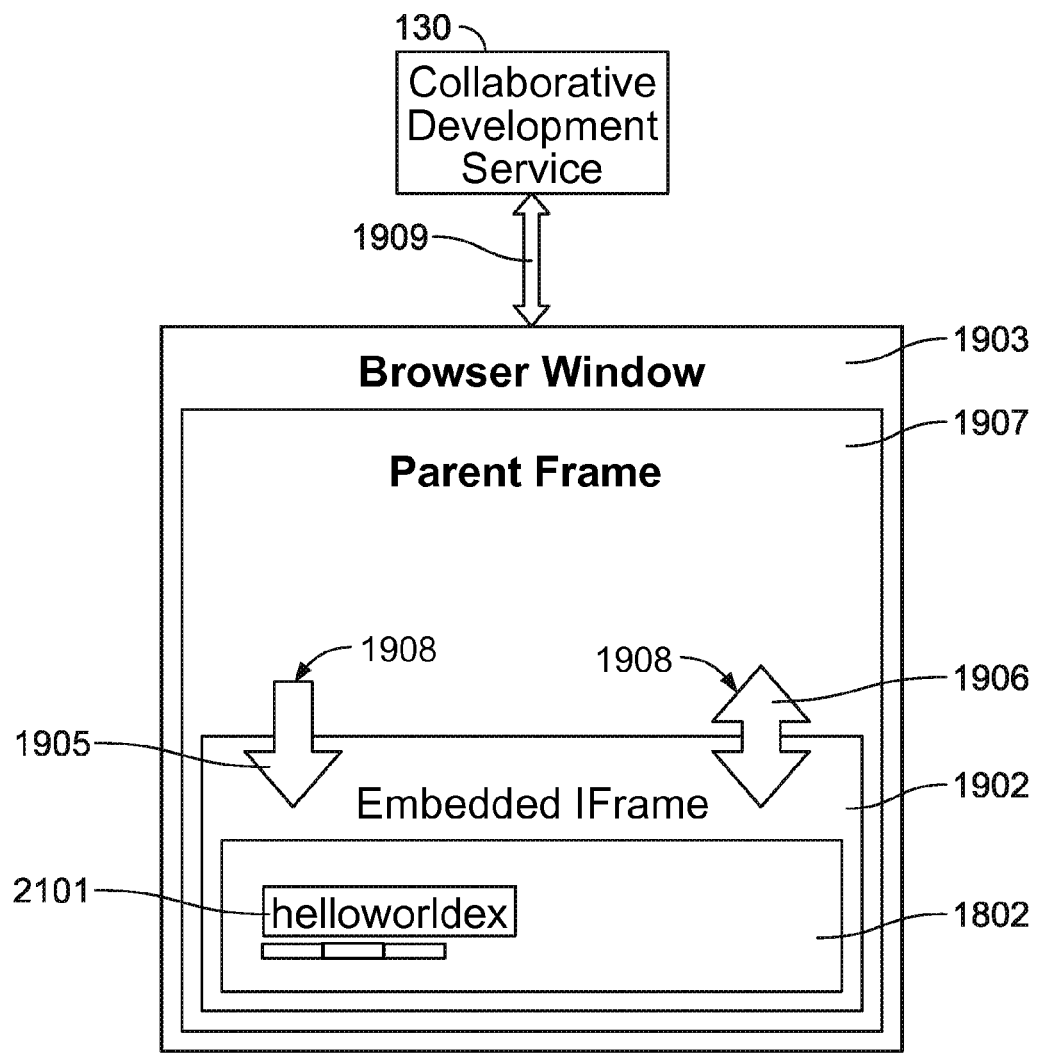
FIG. 22 shows an embedded IFrame containing an updated document in accordance with an embodiment.

The plurality of users subsequently send respective instructions 2001 and to edit object instance "helloworld" 1803, in FIG. 20. In one embodiment, a first user may send instruction 2001 to append the letter "e" (2003) at the end of "helloworld." Substantially simultaneously, a second user may send instruction 2002 to append the letter "x" (2004) at the end of "helloworld." As both the instructions 2001 and 2002 are sent and/or received at approximately the same time, operational transformation rules may be applied, in a manner such as that descried above. Further, instead of redrawing the object instance twice to append letters "e" and "x," only a single redraw combining both the letters "e" and "x" may be determined and performed in a manner such as described above. As such, "e" and "x" are appended to the object instance "helloworld" and an updated object instance "helloworldex" 2101 is displayed, as shown in FIG. 21B. Specifically, the visual representation of object instance 2101 displayed in the embedded IFrame within each of the user's browser windows is updated, as shown in FIG. 22.

Communication is carried out among frames on user device 160, and between user device 160 and collaborative development service 130, in order to implement changes received by the user of the user device as well as changes received by users of other devices. FIG. 21A is a flowchart of a method of providing collaborative development services in accordance with an embodiment. At step 2102, a document is displayed within a first frame embedded within a second frame on a first device, wherein the second frame is in communication with a server. For example, a document being edited using a third party software application may be displayed within a first frame embedded within a second (parent) frame on user device 160-A, in communication with collaborative development service 130. At step 2103, a first change to the document is received from a first user. A user of user device 160-A may edit an object instance such as a word within the document. At step 2104, the first change is transmitted to the server by interframe communication. The first, embedded frame displayed on user device 160-A communicates the change to the parent frame, which transmits an instruction specifying the change to collaborative development service 130. Collaborative development service 130 generates a plurality of transformed operations, based on the user's specified change and on changes introduced by a second user of a second user device, in the manner discussed above. Collaborative development service 130 communicates the transformed operations to user device 160. At step 2105, a plurality of transformed changes to the document, including a transformed version of the first change and a version of a second change made by a user of a second device, are received by interframe communication. The parent frame receives the information specifying the transformed operations, and communicates the operations to the third party application via the embedded frame. The transformed changes are applied to the visual representation of the document.

Figure 23:
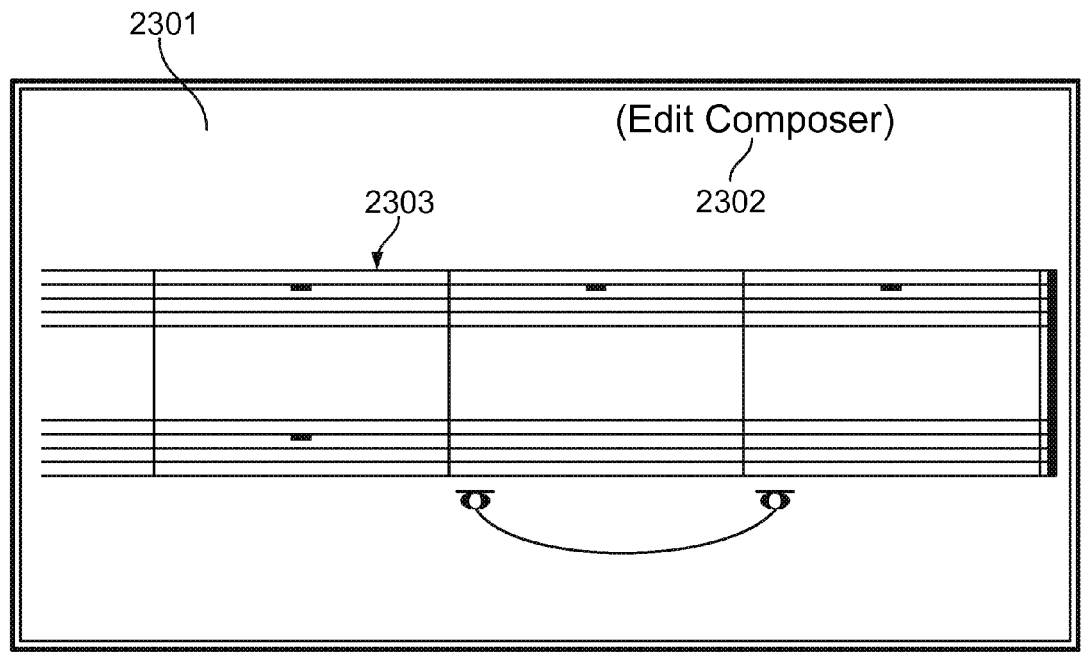
FIG. 23 shows a music editor document in accordance with an embodiment.

Another embodiment in which multiple users use collaborative development service 130 to collaboratively edit a document is illustratively depicted in FIG. 23. FIG. 23 shows a document that may be created using a third party software application, in this case, a music editing application. Document 2301 is presented to each user as an embedded IFrame within a webpage on the user's device. The application may exist in the background and may not be visible to the users. Therefore, the users are able to view document 2301 which includes a staff 2303, text 2302, etc., output on their devices.

In this embodiment, a plurality of users wish to collaborate to write a song. The users may access a blank or partially filled staff-sheet within document 2301. While the users are creating and editing the song, an indicator such as 2302 may indicate to the users that they are in an editing mode. Thus, the users may see text, graphics, etc. stating "Edit Composer" or the like.

Figure 24:
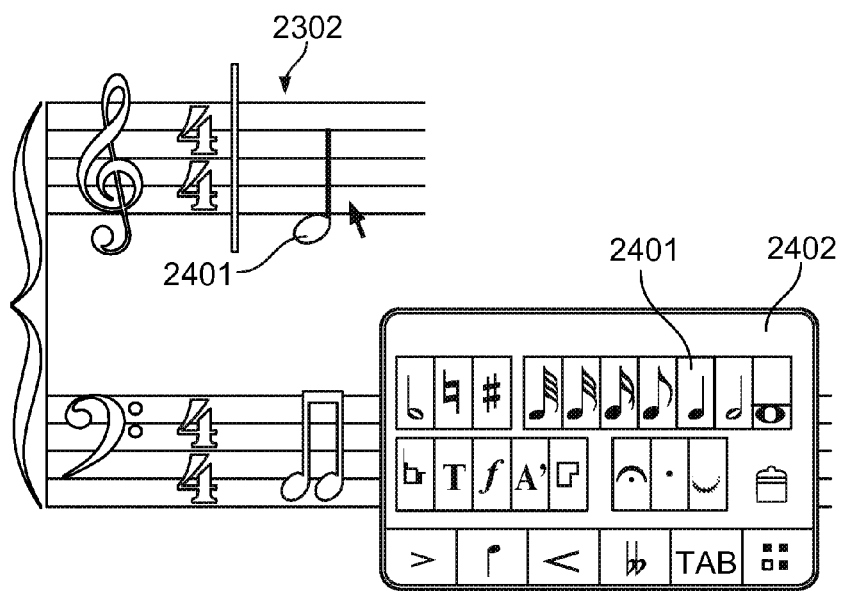
FIG. 24 shows a music editor document in accordance with an embodiment.

In one embodiment, two users, Jan and Joey, wish to compose a new song together. Jan and Joey are located 500 miles apart from each other and wish to use collaborative development service 130 to create their new song. Jan and Joey may place musical notes on the staff by clicking on a location and placing the note on that location. As shown in FIG. 24, when Jan or Joey wishes to add a note 2401, he/she clicks on the appropriate note that may appear on a pop-up menu, 2402. The pop-up menu may include a variety of musical notes, etc. In one embodiment, the notes may be placed on staff 2303 by selection of note 2401 from the pop-up menu.

Figure 25:
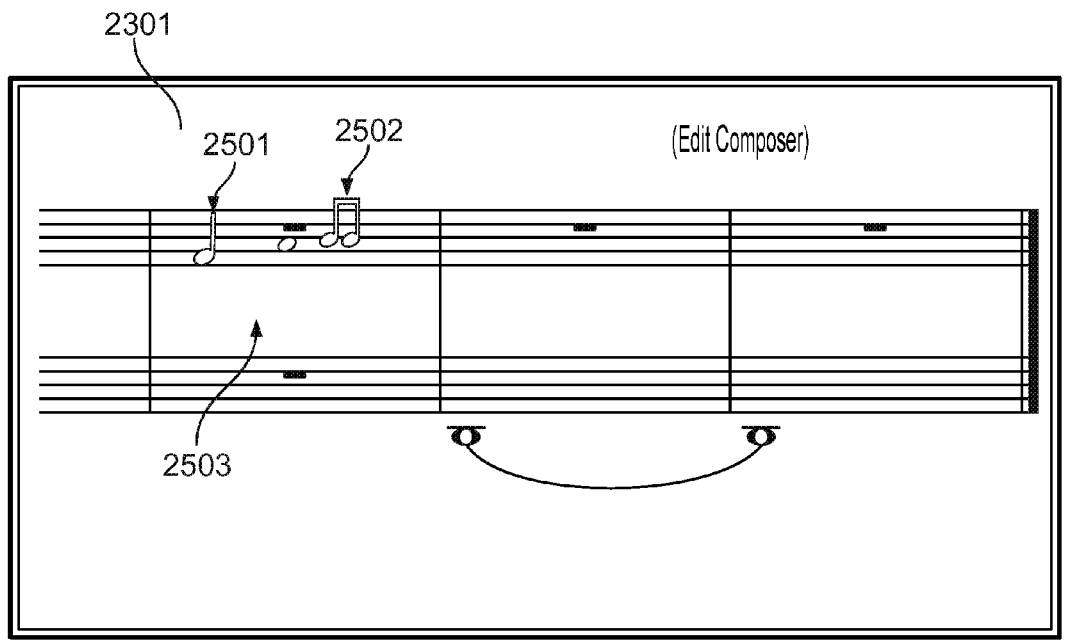
FIG. 25 shows a music editor document in accordance with an embodiment.

In one embodiment illustratively depicted by FIG. 25, Jan wishes to place a note 2501 on the staff at the beginning of a measure 2503 and Joey, substantially simultaneously, wishes to place a note 2502 at the end of measure 2503. In one embodiment, operational transformation rules are applied to the users' changes in a manner such as that described above yielding the results shown in FIG. 25.

Figure 26:
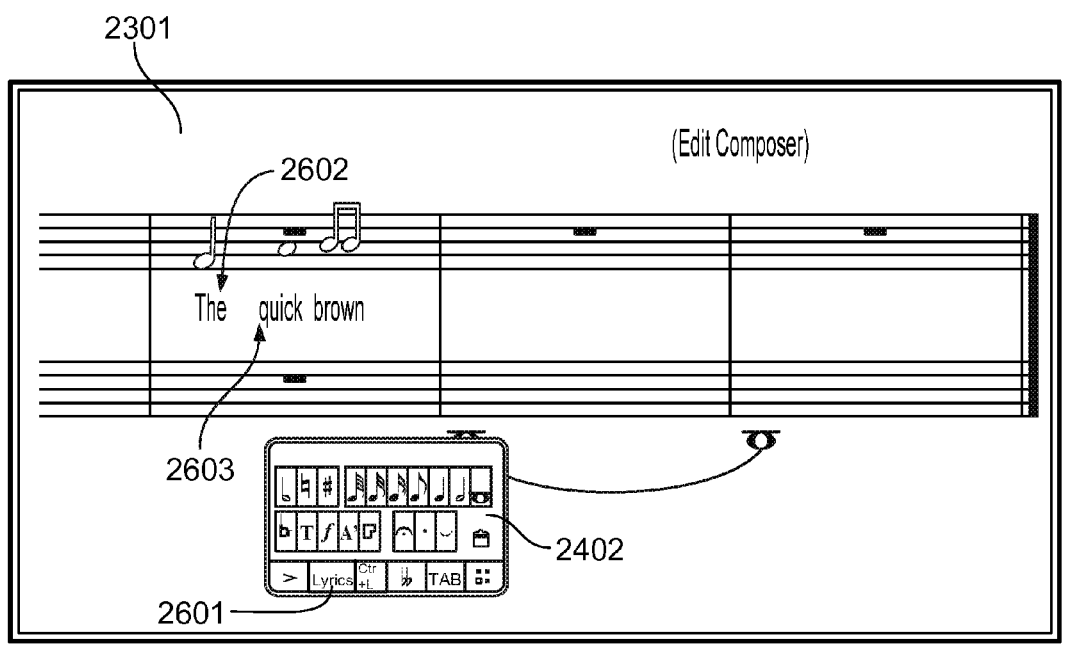
FIG. 26 shows a music editor document in accordance with an embodiment.

Jan and Joey now insert lyrics into the song. The lyrics correspond to the notes. Specifically, Jan and Joey may select an icon 2601 labeled "lyrics" to insert the desired lyrics on of the staff as shown in FIG. 26. In one embodiment, Joey has inserted a word "The," in a location shown by 2602 before the word "brown" that was previously placed on the bottom of the staff. Jan then wishes to place the lyrics "quick" at location 2603 also before the word "brown." One or more operational transformation rules are applied, in a manner such as that described above, to Jan and Joey's changes, and the phrase "The quick brown" is produced. After the operational transformation rules have been applied, the visual representation shown on Joey's computer and Jan's computer and the corresponding representation on the server of the collaborative development service 130 are consistent. For example, both Jan and Joey's computer may display the result shown in FIG. 26.

Figure 27:
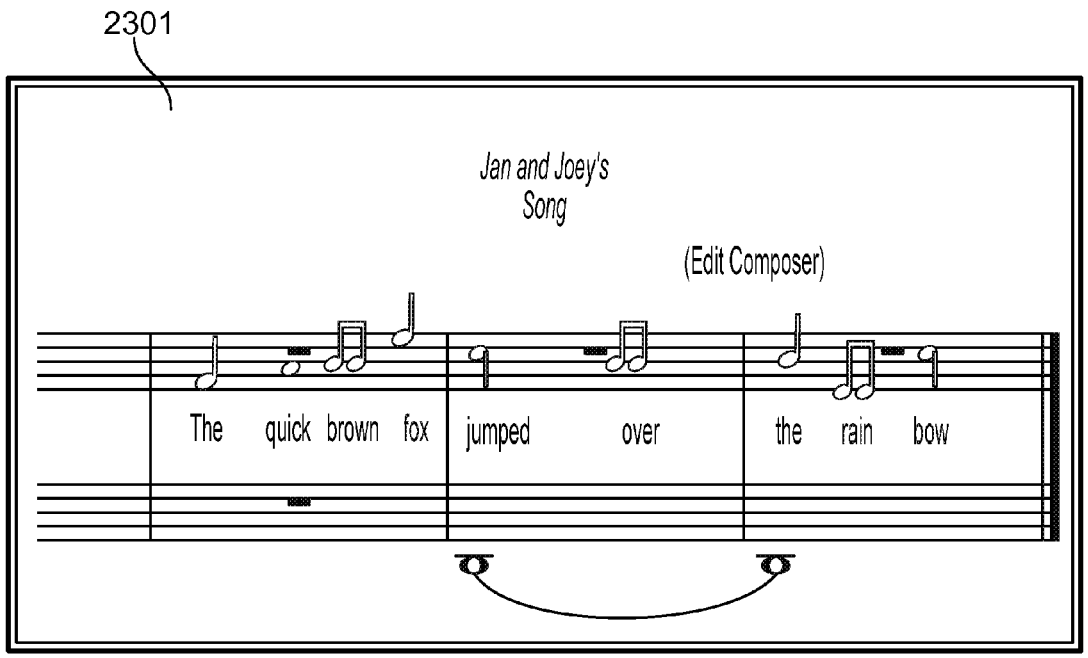
FIG. 27 shows a music editor document in accordance with an embodiment.

At this point, Jan and Joey may collaborate further to complete their song, as depicted by FIG. 27. Jan and Joey also collaborate to create the title of their song which is "Jan and Joey's Song." In one embodiment, Jan and Joey wish to create and/or edit the title of the song substantially simultaneously and operational transformational rules are applied in such a manner as described above. Referring to FIG. 27, Jan and Joey have completed their song collaboratively and their visual displays have been updated in real-time during the collaboration.

Figure 28:
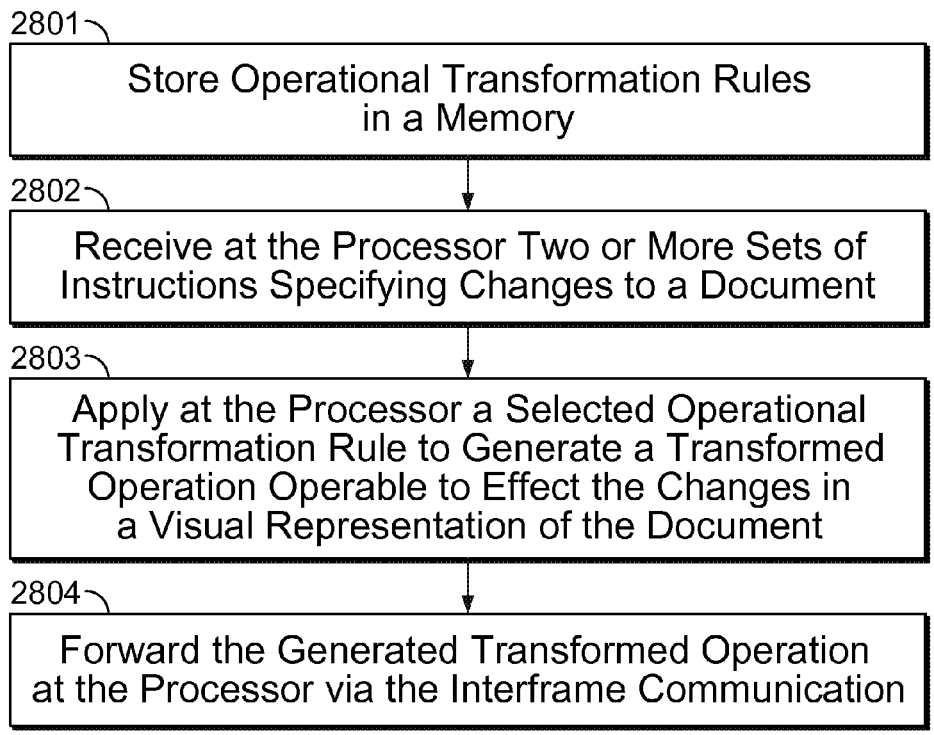
FIG. 28 is a flowchart of a method of providing collaborative development services in accordance with an embodiment.

FIG. 28 is a flowchart of a method of providing collaborative editing services. Operational transformation rules are stored in a memory, at step 2801. The processor, which is in communication with the memory, receives, via interframe communication, two or more sets of instructions, specifying respective changes to the document, at step 2802. The two or more sets of instructions may be received substantially simultaneously in real-time. At the processor, a selected operational transformation rule is applied to generate a transformed operation that effects the changes specified by the two or more sets of instructions in a visual representation of the document, in a consistent manner, at step 2803. At the processor, the generated transformed operation is forwarded via interframe communication, at step 2804.

In one embodiment, Jan wishes to make a change to the musical notes editor document and sends instructions to the document indicating the change she wants to make. The change is communicated by RPCs from the application document to the parent frame to a server(s) of collaborative development service 130. In this way, even though Jan has changed some part of the song she is writing locally, the change does not go into effect on all user devices (such as Joey's user device) until the change has been accepted by collaborative development service 130. Such hierarchy ensures the safety of collaborative development service 130 (and/or a server associated with collaborative development service 130) as each user is prohibited from directly communicating with collaborative development service 130. Additionally, such a hierarchy protects against malicious attacks by an untrusted party.

Additionally, users are provided with the following features. Such features may be available to user, of any third party application that is created and accessed using collaborative development service 130.

Chat

In one embodiment, users are collaborating on a creating a project, such as writing a song, may utilize a chat feature. In one embodiment, users may wish to conduct a transient discussion on the side of the application in a chat window, for example. The chat window may be located anywhere on the users' screens.

Revision History

In one embodiment, users may view all changes made to a document by viewing the revision history. The revision history may show a time stamp of when edits were made. For example, if Joey deleted notes and lyrics from the music editor document, Jan may view the revision history indicative of Joey's edits. Thus, Jan and Joey may access any version of the document at anytime. In one embodiment, Jan and Joey are provided with a list of actions performed including the name of the user that performed the action, the date and time the action was performed and what the user did. If Jan wishes to access lyrics that were created for the song in the past, she may do so at any time without affecting the current state of the song. Also, Jan may restore the song to an earlier state and have the option of restoring it to the current state or any other state at any time.

Users may access other functions, and the revisions are not limited to revisions to text. The revision history function may also show any comments created by the users. In one embodiment, the users may revert to an earlier version of the document by selecting a particular revision history session. Restoring the document to an earlier version of the document does not delete the current version of the application; rather, all versions are viewable and selectable by the users at any time.

Collaborative development service 130 may be used by enterprise-level clients to manage documents and data. In accordance with an embodiment, an enterprise-level client may specify a policy to govern the management of data and documents. In response, collaborative development service 130 manages the client's documents in accordance with the client-specified policy. For example, if an employee of the enterprise generates a document via collaborative development service 130, the document is managed in accordance with the policy specified by the enterprise. In another example, if an employee of the enterprise creates a software application via collaborative development service 130, the software application, including any related code or other data, is managed in accordance with the policy specified by the enterprise.

An enterprise may, for example, grant various access rights to various categories of employees with respect to documents and data. Certain employees may be granted read-only access, other employees may be granted reading and editing rights, other employees may be granted administrator rights, etc. Referring to FIG. 3, collaborative development service 130 stores and records the access rights in a policy file 3090 in memory 325.

Geo-Location of Data

Figure 29:
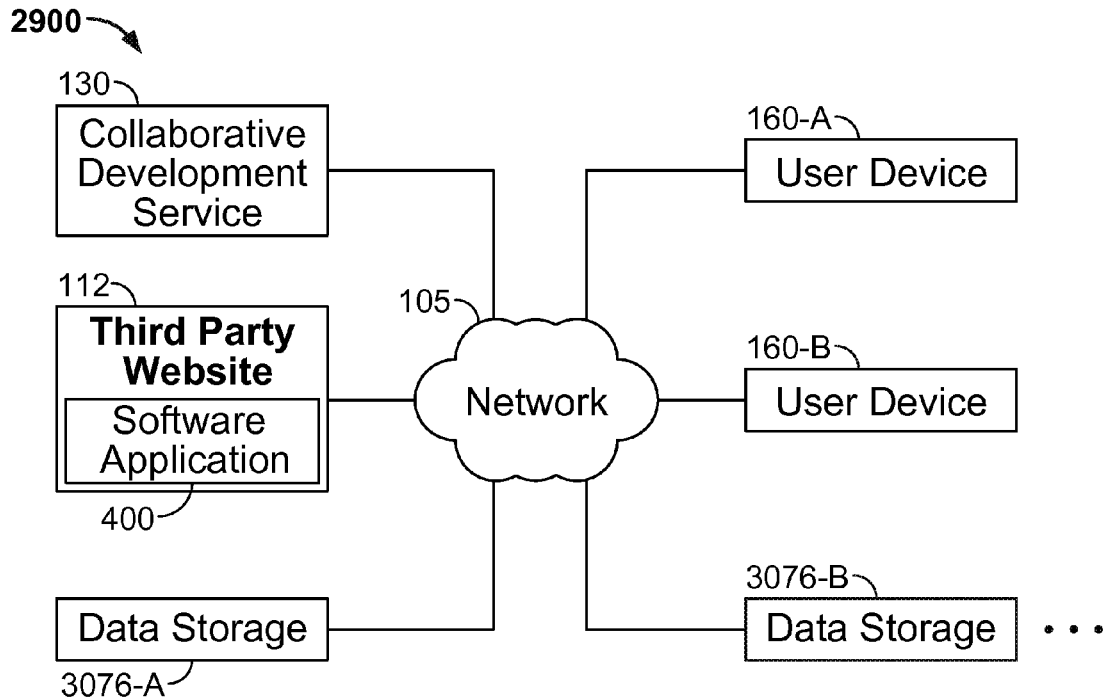
FIG. 29 shows a communication system that may be used to provide data management services in accordance with an embodiment.

For example, in one embodiment, an enterprise may specify a policy governing the storage of data and documents created using collaborative development service 130. FIG. 29 shows a communications system 2900 similar to that shown in FIG. 1, in which collaborative development service 130 maintains, or has access to, multiple data storage facilities located in a variety of countries and jurisdictions throughout the world. Specifically, collaborative development service 130 maintains or has access to data storage 3076-A, data storage 3076-B, etc. Each data storage 3076 may be, for example, a data storage device located in a respective country or jurisdiction. For example, data storage 3076-A may be a data storage device located in Paris, France, data storage 3076-B may be a data storage device located in Sao Paolo, Brazil, etc.

Figure 30:
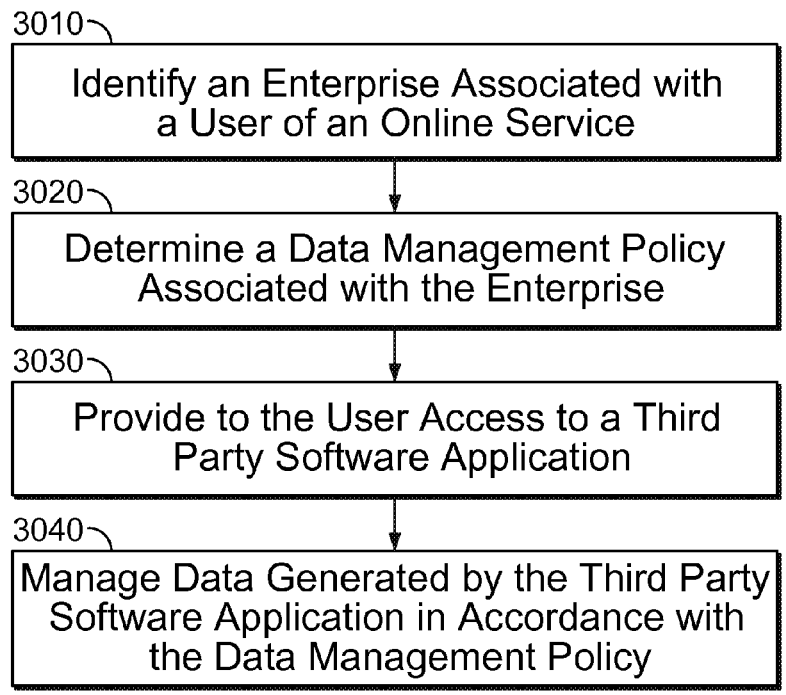
FIG. 30 is a flowchart of a method for providing data management services in accordance with an embodiment.

FIG. 30 is a flowchart of a method of managing data in accordance with an embodiment. Supposing that Enterprise XYZ, an enterprise located in France, wishes to comply with a particular French law requiring that all documents of a certain type be stored within the territory of France, the enterprise may access collaborative development service 130 and specify a requirement that all documents and other data meeting certain criteria must be stored and maintained within the territory of France.

Figure 31:
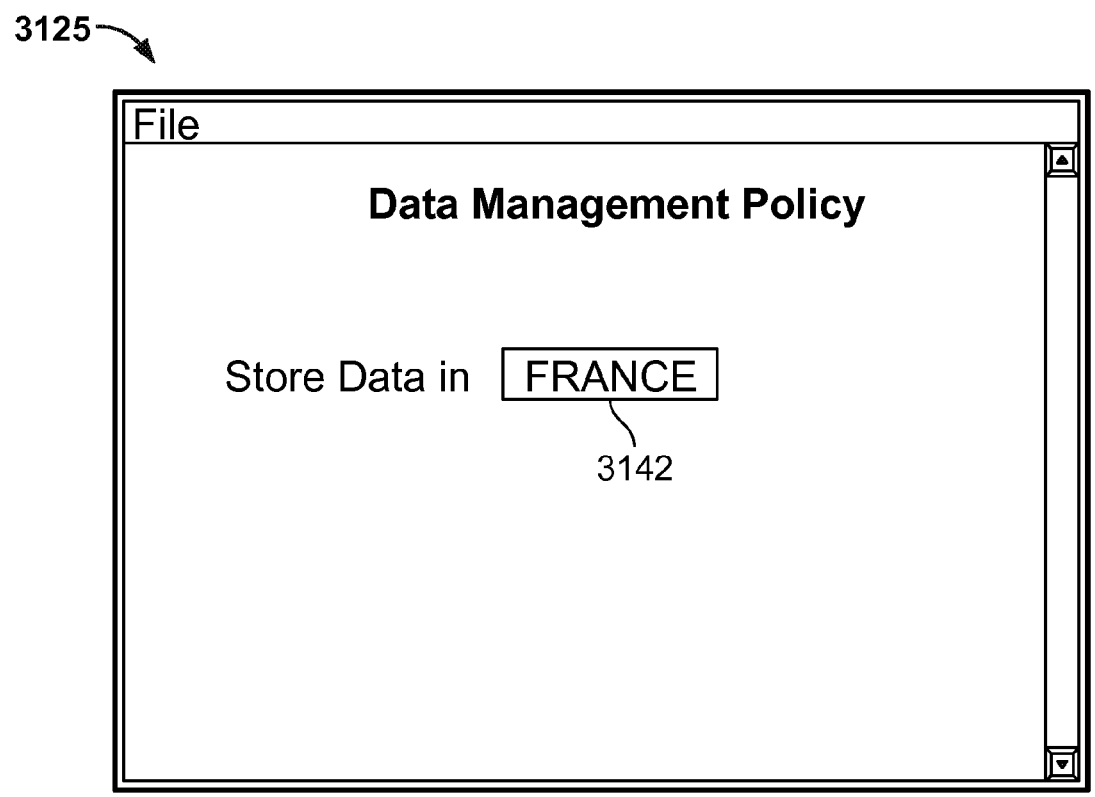
FIG. 31 shows a data management policy web page in accordance with an embodiment.

FIG. 31 shows a data management policy web page 3125 on which a client may specify a data management policy. In the illustrative example, Enterprise XYZ specifies "FRANCE" in a location field 3142, indicating that all data and documents must be stored in France. In other embodiments, other policies may be specified in a similar manner. Referring to FIG. 3, collaborative development service 130 records the enterprise's specified policy in policy file 3090.

The policies established by Enterprise XYZ are now applied to data, documents, and software generated by any employee of the enterprise. At step 3010, an enterprise associated with a user of an online service is identified. Thus, when an employee of Enterprise XYZ accesses collaborative development service 130, collaborative development service 130 determines that the employee is associated with Enterprise XYZ. For example, collaborative development service 130 may identify the individual as an employee of Enterprise XYZ based on his or her username. At step 3020, a data management policy associated with the enterprise is determined. Collaborative development service 130 accordingly retrieves from memory data defining the data management policy of Enterprise XYZ. In this example, collaborative development service 130 retrieves the policy specifying that certain data must be stored in France.

At step 3030, the user is provided access to a third party software application. In the illustrative embodiment, the employee accesses third party application 400 via collaborative development service 130 in the manner described above, and generates one or more documents. The employee may collaborate with other employees of Enterprise XYZ to edit the documents in a collaborative manner, as described above. For example, the employee, and one or more of the employee's co-workers, may access third party software application 400 via collaborative development service 130 and create a text document. The employee and his or her co-workers may subsequently edit the document in a collaborative manner, in the manner described above. In other embodiments, the employee and his or her co-workers may create and edit other types of documents associated with other content types.

At step 3040, data generated by the third party application is managed in accordance with the data management policy. Accordingly, when the employee accesses third party software application 400 and creates a document meeting the criteria specified in the policy, collaborative development service 130 stores the document in a storage device located in the location specified by the policy, for example, in France. If the employee edits the document, all versions and copies of the document are stored within the territory of France. If the employee accesses third party application 400 and generates other data (or software) that meet the policy's specified criteria, the data is stored within the territory of France, in accordance with the policy of Enterprise XYZ.

Tracking and Auditing

In another embodiment, users collaborating to edit a document may each view and track certain information concerning the other users. Such information may include, for example, the date and time another user joined and left the collaboration (i.e., accessed a document or software application), presence information relating to another user in the document or application, activities of another user, revisions made by another user, and another user's audit trail. Collaborative development service 130 may provide such data based on information stored in activity table 428, for example. Additionally, a user may view the location of another user's cursor in the document in real-time.

Collaborative development service 130 also provides an auditing service whereby specified documents and data may be analyzed based on criteria specified by the client to determine whether the management of the documents and data are in compliance with the client's policies, or whether the documents or data are in compliance with any other rules or regulations. Collaborative development service 130 also provides an encryption service that may be used in connection with an audit of the client's documents and data. For example, in response to a client request that specified documents and data (pertaining to an audit) be encrypted, collaborative development service 130 identifies the requested documents and data, and encrypts the documents and data.

E-Discovery

In accordance with an embodiment, a client may direct that collaborative development service 130 identify data and documents meeting certain criteria and produce such data and documents in electronic form. This service may be used, for example, by an enterprise involved in a litigation, in response to a discovery request received from an adversary. The enterprise may specify one or more criteria to be used as a basis for identifying relevant documents. For example, an enterprise may request that a search be performed to identify all documents that contain the name "John Doe," all design documents pertaining to a particular product, etc.

The enterprise may accordingly access collaborative development service 130 and specify one or more criteria. In response, collaborative development service 130 searches the client's documents and other data based on the specified criteria, and provides the documents and data resulting from the search to the client. The results of the search may be provided in any one of a variety of formats, such as a list of documents, a database containing list of links to documents, etc.

Full-Text Indexing

In another embodiment, collaborative development service 130 provides a full text indexing capability to clients. For example, any part of a document maintained at collaborative development service 130 may be indexed for use in a full-text indexing search, regardless of the content type. In one embodiment, the indexing may be performed automatically with respect to all user-entered text. In order to perform full-text indexing, optical character recognition (OCR) or the like may be implemented with respect to newly created text or other items input by users. This service may allow a client to perform a keyword search. Such capabilities may be provided automatically to clients by collaborative development service 130. In another embodiment, full-text indexing may be provided with respect to non-text content.

Unlike existing methods and systems, the systems and methods described above advantageously allow an enterprise-level client of an online document processing service, such as collaborative development service 130, to establish policies that are applicable to all or a selected portion of the client's data and documents. Advantageously, auditing and verification services are also provided.

Discussion

In accordance with an embodiment, employees of a client may use a discussion feature to attach comments relating to a particular node of an object within a document. A discussion thread may also be attached to a particular node of an object. The comment or discussion thread is attached to the particular node. Comments and discussion threads may be added in this manner within a document regardless of the content type. For example, in a text document, an employee may place his or her cursor at a particular character in a text document and attach a comment to that particular character. In an image, an employee may place a cursor at an object within the image and attach a comment or discussion thread to the object. An employee developing a software application may attach a comment or discussion thread to a selected component of a data model.

Offline Support

In accordance with an embodiment, a document and related data may be stored in a user device 160, to enable a user of the user device to edit the document while offline. For example, documents may be stored locally on a user device using HTML5 offline storage.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of updating a document based on instructions received from multiple devices, the method comprising:
   providing, by a server, via a network, to first and second devices, an option to access a software application maintained by a third party website independent of the server;
   providing, by the server, to the first and second devices, via embedded frames within parent frames of the third party website, access to a document generated by the software application associated with the third party website;
   receiving from the first device a first instruction specifying a first change to an object instance within the document;
   receiving from a second device a second instruction specifying a second change to the object instance;
   communicating the first change and the second change to the parent frames;
   transmitting the first change and the second change to the server;
   determining a transformed operation based on the first change and the second change, the transformed operation comprising a third change that is different from the first and second changes, wherein the transformed operation resolves conflicts between the first and second changes while maintaining the effect of each change, wherein determining the transformed operation comprises:
      determining if a first result of applying the first change and then the second change to the object instance, and a second result of applying the second change and then the first change to the object instance, are the same; and
      determining the transformed operation, when it is determined that the first and second results are not the same;
   transmitting to the first device a first request to apply the transformed operation to a first visual representation of the object instance;
   transmitting to the second device a second request to apply the transformed operation to a second visual representation; and
   wherein the first request and the second request are communicated from the parent frames to the software application via the embedded frames.

2. The method of claim 1, further comprising:
   determining a redraw approach that effects the transformed operation in a visual representation of the object instance using fewer redraws than a number of fundamental edits associated with the-transformed operation.

3. The method of claim 1, further comprising:
   allowing a first user employing the first device and a second user employing the second device to access the object instance substantially simultaneously.

4. The method of claim 3, wherein the second instruction is received from the second device prior to a transmission to the second device of a request to apply the first change to the second visual representation of the object instance.

5. The method of claim 4, wherein the first and second instructions are stored and subsequently processed in accordance with a batch processing method.

6. The method of claim 1, further comprising:
   generating a first reverse operation corresponding to a reverse of the transformed operation; and
   storing the first reverse operation on a stack.

7. The method of claim 6, further comprising:
   receiving a selection of an undo option from a user;
   in response to the selection, retrieving the first reverse operation from the stack; and
   applying the first reverse operation to the object instance.

8. The method of claim 1, wherein the object instance comprises a data type selected from a primitive, an ordered list, and a map.

9. The method of claim 1, wherein the object instance is associated with a context type selected from a text document, a spreadsheet document, drawing, a photograph, an image, a video, a music document, software code, a game, and a design document.

10. The method of claim 1, further comprising:
    storing the first instruction on a user device, using an HTML5 offline storage.

11. A non-transitory computer readable medium having program instructions stored thereon, the instructions capable of execution by a processor and defining the steps of:
    providing, by a server, via a network, to first and second devices, an option to access a software application maintained by a third party website independent of the server;
    providing, to the first and second devices, via embedded frames within parent frames of the third party website, access to a document generated by the software application associated with the third party website;
    receiving from the first device a first instruction specifying a first change to an object instance within the document;
    receiving, from the second device a second instruction specifying a second change to the object instance;
    communicating the first change and the second change to the parent frames;
    transmitting the first change and the second change to the server;
    determining a transformed operation based on the first change and the second change, the transformed operation comprising a third change that is different from the first and second changes, wherein the transformed operation resolves conflicts between the first and second changes while maintaining an effect of each change, wherein determining the transformed operation comprises:
       determining if a first result of applying the first change and then the second change to the object instance, and a second result of applying the second change and then the first change to the object instance, are the same; and
       determining the transformed operation, when it is determined that the first and second results are not the same;
    transmitting to the first device a first request to apply the transformed operation to a first visual representation of the object instance;
    transmitting to the second device a second request to apply the transformed operation to a second visual representation; and
    wherein the first request and the second request are communicated from the parent frames to the software application via the embedded frames.

12. The non-transitory computer readable medium of claim 11, further comprising program instructions defining the step of:

determining a redraw approach that effects the transformed operation in a visual representation of the object instance using fewer redraws than a number of fundamental edits associated with the transformed operation.

13. The non-transitory computer readable medium of claim 11, further comprising program instructions defining the step of:

allowing a first user employing the first device and a second user employing the second device to access the object instance substantially simultaneously.

14. The non-transitory computer readable medium of claim 13, wherein the second instruction is received from the second device prior to a transmission to the second device of a request to apply the first change to the second visual representation of the object instance.

15. The non-transitory computer readable medium of claim 11, further comprising program instructions defining the steps of:

generating a first reverse operation corresponding to a reverse of the transformed operation; and storing the first reverse operation on a stack.

16. The non-transitory computer readable medium of claim 15, further comprising program instructions defining the steps of:

receiving a selection of an undo option from a user;

in response to the selection, retrieving the first reverse operation from the stack; and applying the first reverse operation to the object instance.

17. The non-transitory computer readable medium of claim 11, wherein the object instance comprises a data type selected from a primitive, an ordered list, and a map.

18. The non-transitory computer readable medium of claim 11, wherein the object instance is associated with a context type selected from a text document, a spreadsheet document, a drawing, a photograph, an image, a video, a music document, software code, a game, and a design document.

19. The non-transitory computer readable medium of claim 11, further comprising program instructions defining the step of:

storing the first instruction on a user device, using an HTML5 offline storage.

\* \* \* \* \*